US012154168B2

(12) United States Patent
Aiba

(10) Patent No.: US 12,154,168 B2
(45) Date of Patent: Nov. 26, 2024

(54) FINANCIAL PRODUCT TRANSACTION MANAGEMENT APPARATUS AND PROGRAM

(71) Applicant: MONEY SQUARE HOLDINGS, INC., Tokyo (JP)

(72) Inventor: Hitoshi Aiba, Tokyo (JP)

(73) Assignee: MONEY SQUARE HOLDINGS, INC., Tokyo (JP)

(*) Notice: Subject to any disclaimer, the term of this patent is extended or adjusted under 35 U.S.C. 154(b) by 0 days.

(21) Appl. No.: 17/703,606

(22) Filed: Mar. 24, 2022

(65) Prior Publication Data

US 2022/0309580 A1 Sep. 29, 2022

(30) Foreign Application Priority Data

Mar. 26, 2021 (JP) .................................. 2021-053579

(51) Int. Cl.
*G06Q 40/00* (2023.01)
*G06Q 40/04* (2012.01)

(52) U.S. Cl.
CPC .................................. *G06Q 40/04* (2013.01)

(58) Field of Classification Search
None
See application file for complete search history.

(56) References Cited

U.S. PATENT DOCUMENTS 7,584,130 B1 * 9/2009 Schluetter ............. G06Q 40/00
705/37
7,603,303 B1 * 10/2009 Kraus .................... G06Q 40/00
705/35

FOREIGN PATENT DOCUMENTS

JP 2006-99787 A 4/2006
WO WO-2014185554 A1 * 11/2014 ............. G06Q 40/04

* cited by examiner

*Primary Examiner* — Olabode Akintola
(74) *Attorney, Agent, or Firm* — STAAS & HALSEY LLP

(57) ABSTRACT

The financial product transaction management apparatus includes an order information generation unit configured to generate order information as information for conducting trading of the financial product. Here, the order information generation unit includes a profit amount calculation unit configured to calculate, by calculation, a profit amount to be obtained through a transaction of one first order and one second order, for a specific financial product, among first orders each being an order to be traded antecedently and second orders each being an order to be traded subsequently to the corresponding first order, based on profit margin setting information for setting a profit margin as a size of profit to be obtained through the transaction of the one first order and the one second order, and order amount setting information for setting an order amount of the one first order and/or an order amount of the one second order.

6 Claims, 15 Drawing Sheets

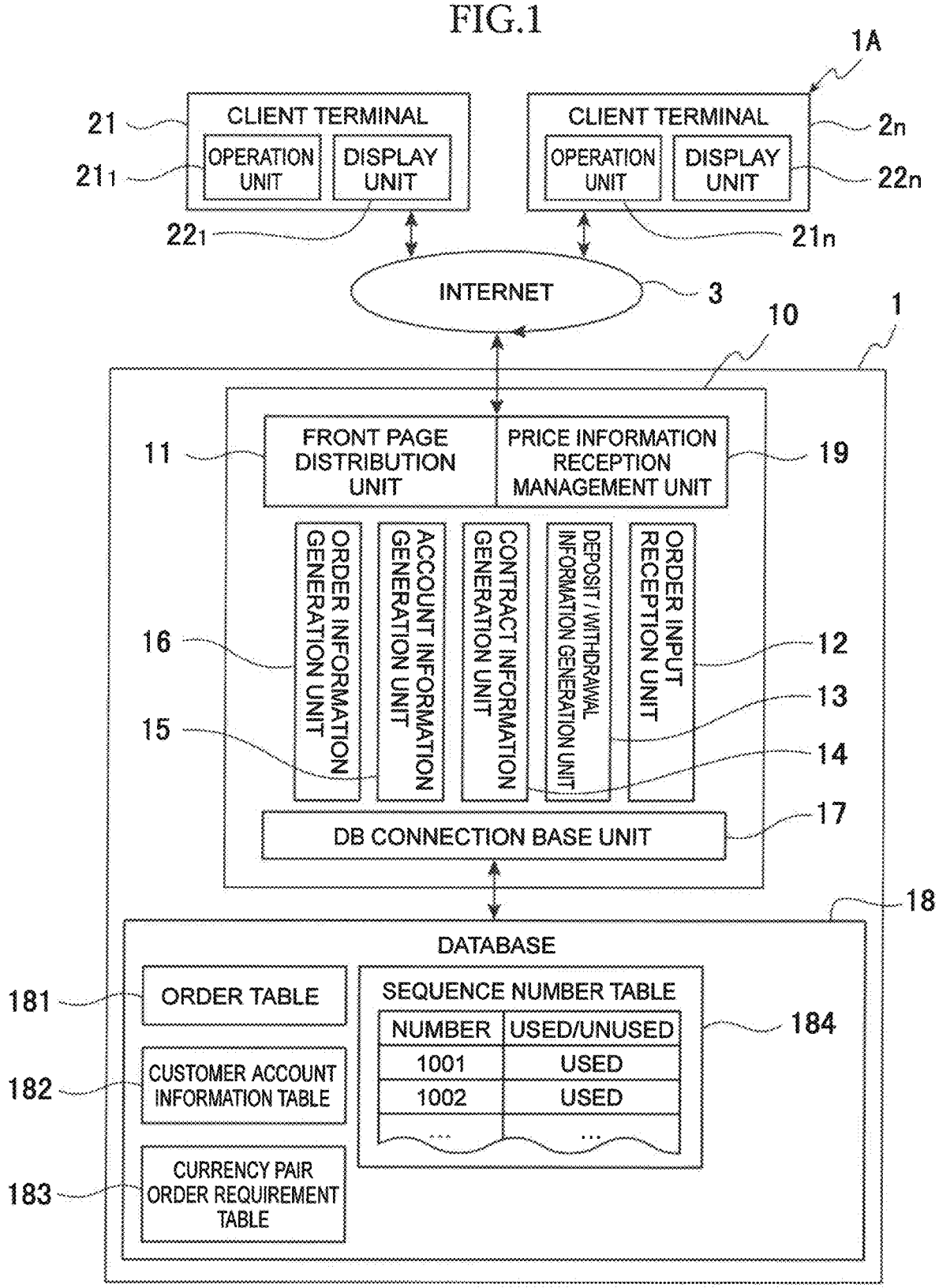

FIG.2

ORDER TABLE
(FIELD DEFINITION)

| No | FIELD NAME | TYPE | RECORD LENGTH | NOT NULL | DEFAULT VALUE | NOTE |
|---|---|---|---|---|---|---|
| 1 | ord_seq | int8 | 8 | NOT NULL | | ORDER NUMBER |
| 2 | cust_seq | int8 | 8 | NOT NULL | | CUSTOMER NUMBER |
| 3 | style_id | int4 | 4 | NOT NULL | | PRODUCT NAME |
| 4 | ccy_pair_id | int4 | 4 | NOT NULL | | CURRENCY PAIR ID |
| 5 | ord_amnt | numeric | 6,553,565,531 | NOT NULL | | ORDER AMOUNT |
| 6 | ord_time | timestamp | 8 | NOT NULL | | ORDER TIME |
| 7 | buy_sell_id | int4 | 4 | NOT NULL | | TRADE |
| 8 | ord_rate | numeric | 6,553,565,531 | NOT NULL | | ORDER PRICE |
| 9 | limit_time | timestamp | 8 | NOT NULL | | ORDER TIME LIMIT |
| 10 | ord_cond | int4 | 4 | NOT NULL | 0 | ORDER TYPE |
| 11 | trail_range | int4 | 4 | NOT NULL | | TRAIL PRICE RANGE |
| 12 | through_range | int4 | 4 | NOT NULL | | THROUGH PRICE RANGE |
| 13 | new_close | int4 | 4 | NOT NULL | | NEW/SETTLEMENT |

181a — 181
181b ORDER NUMBER
181c CUSTOMER NUMBER
181d PRODUCT NAME
181e CURRENCY PAIR ID
181f ORDER AMOUNT
181g ORDER TIME
181h TRADE
181i ORDER PRICE
181j ORDER TIME LIMIT
181k ORDER TYPE
181m TRAIL PRICE RANGE
181n THROUGH PRICE RANGE

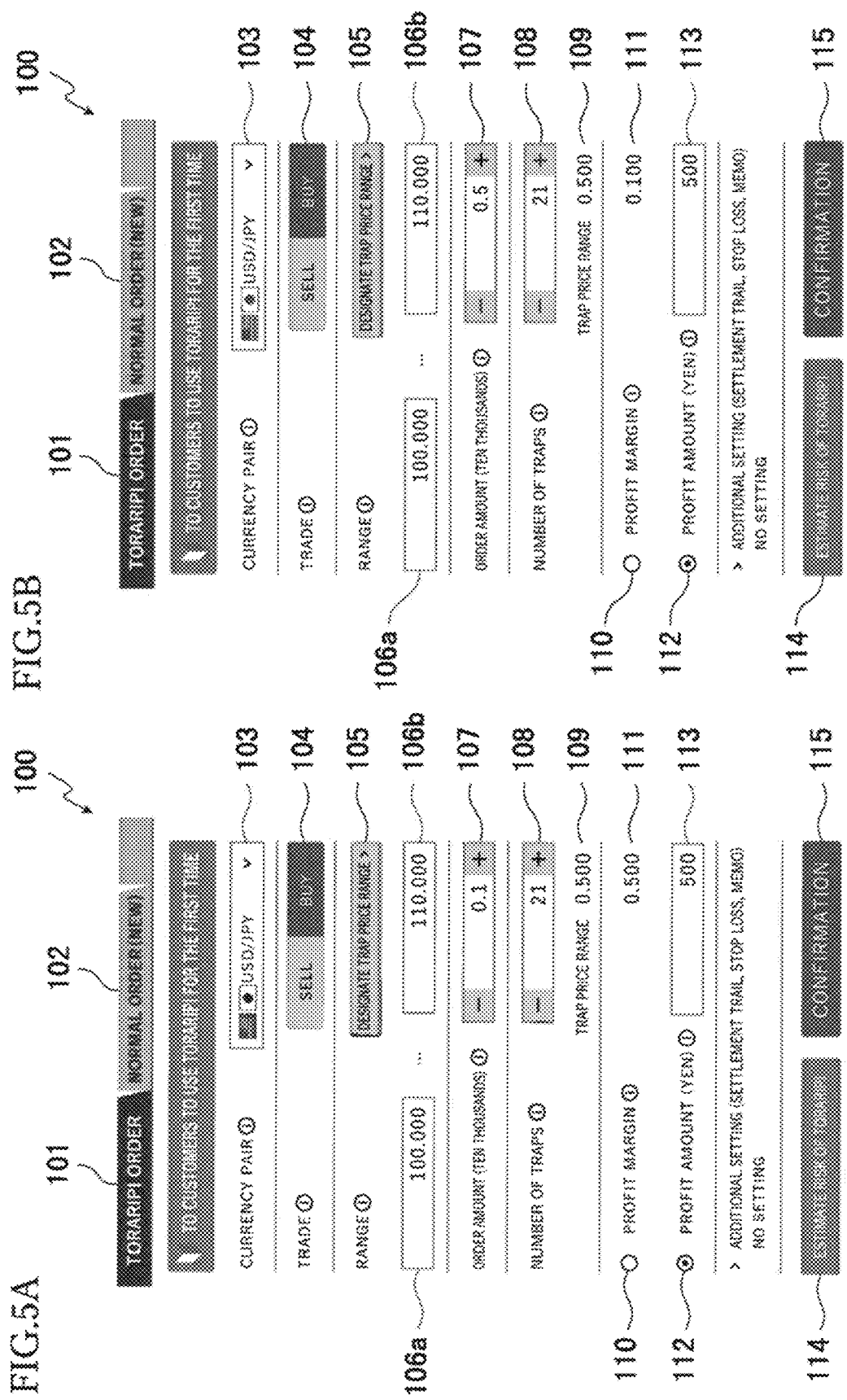

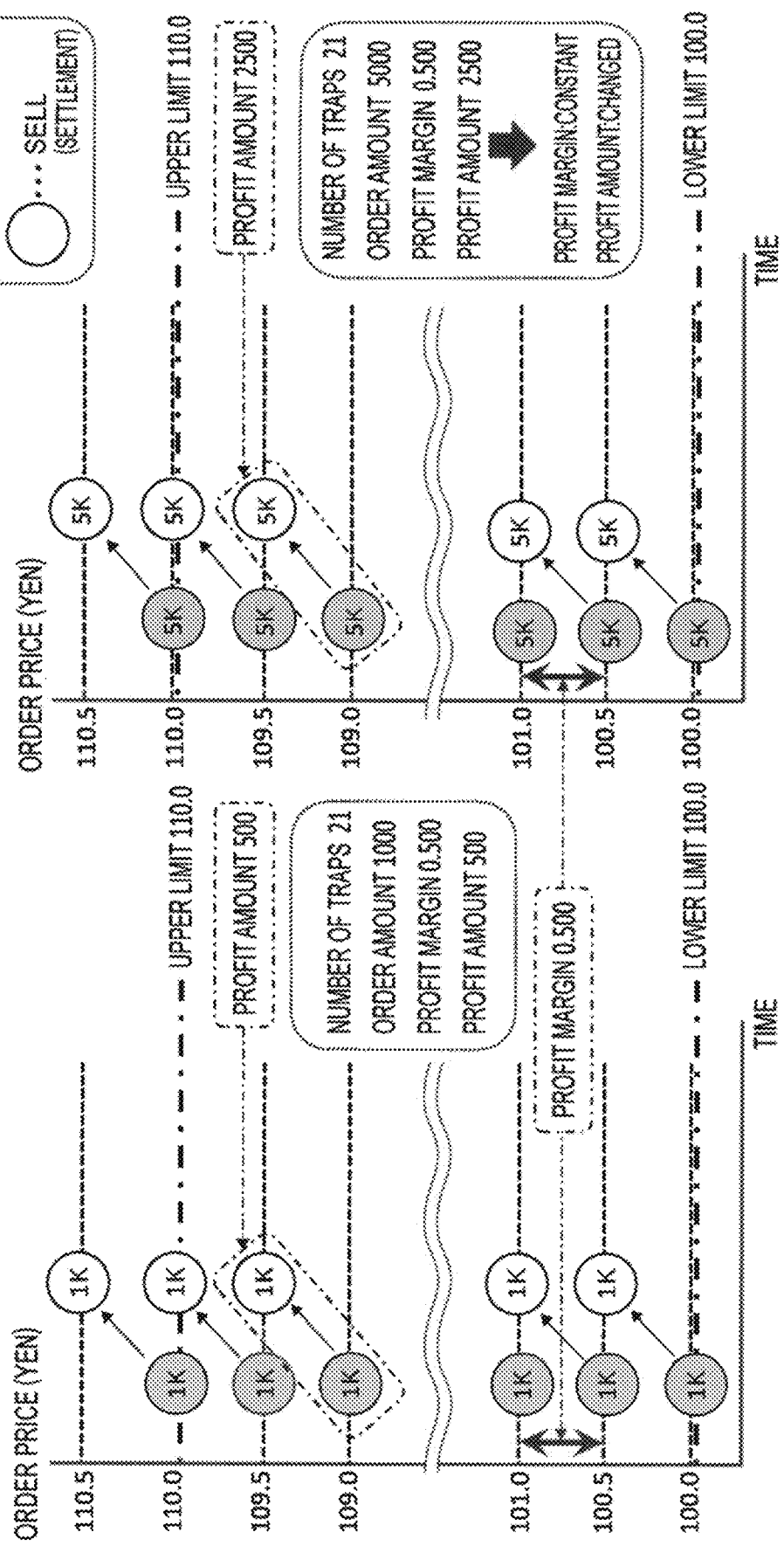

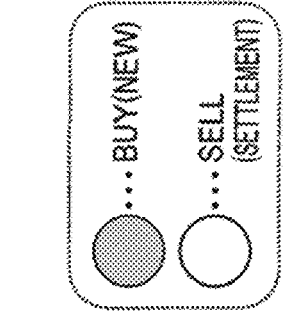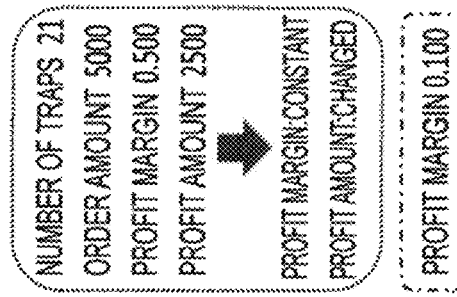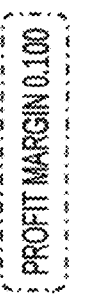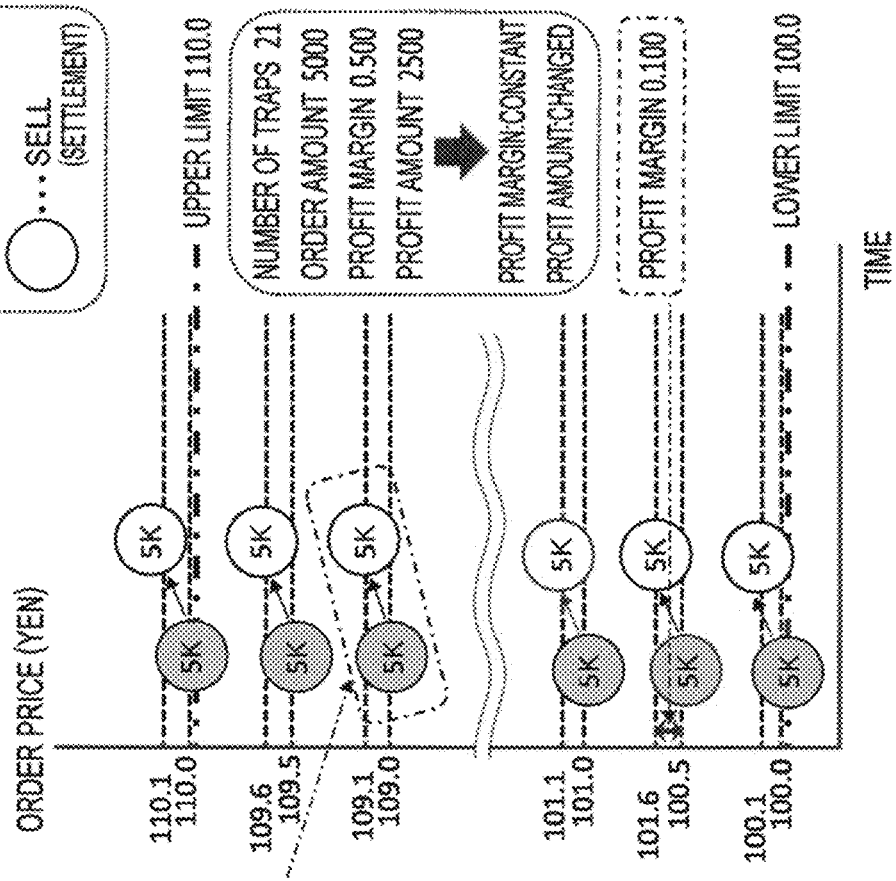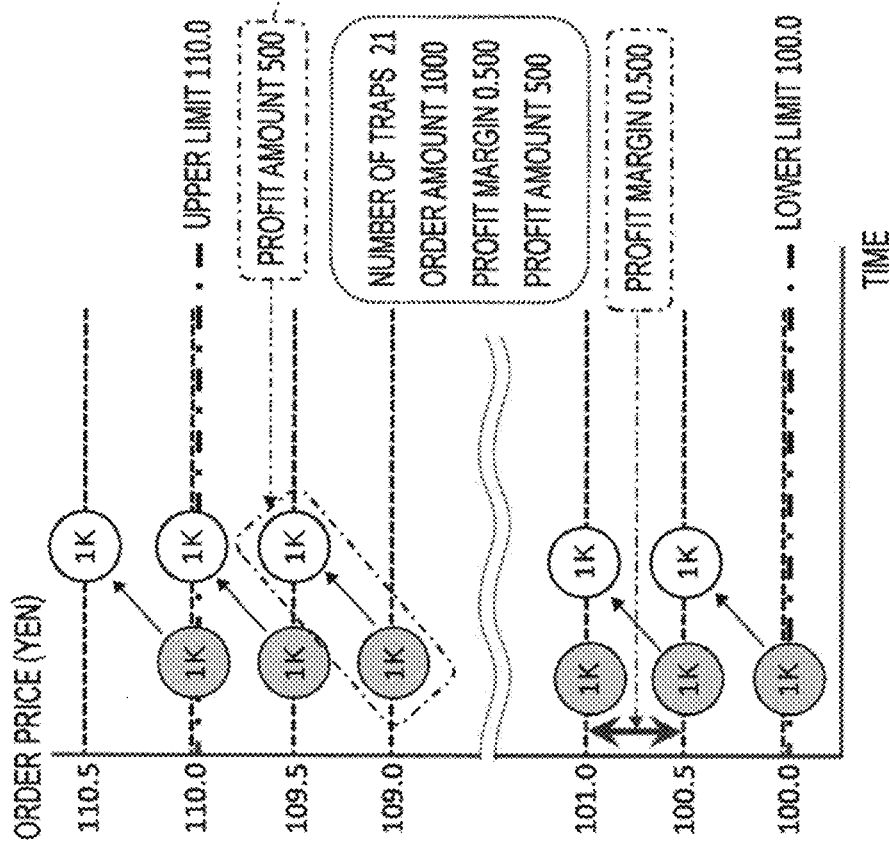

FIG.8

| ORDER NUMBER | CUSTOMER NUMBER | CURRENCY PAIR | ORDER AMOUNT | ORDER TIME | TRADE | ORDER PRICE | ORDER TIME LIMIT | ORDER TYPE | PROFIT MARGIN | PROFIT AMOUNT | NEW/ SETTLEMENT | MARKET ORDER/ LIMIT ORDER/ STOP LIMIT ORDER | UNORDERED/ ORDERED/ CONTRACTED | SETTLEMENT TRAIL | STOP LOSS |
|---|---|---|---|---|---|---|---|---|---|---|---|---|---|---|---|
| 1000 | 9999 | USD/JPY | 1000 | 2021/3/1 10:00 | BUY | 110.00 | 2999/12/31 23:59 | TORARIPI | 0.500 | 2500 | NEW | LIMIT ORDER | ORDERED | NONE | NONE |
| 1001 | 9999 | USD/JPY | 1000 | 2021/3/1 10:00 | BUY | 109.50 | 2999/12/31 23:59 | TORARIPI | 0.500 | 2500 | NEW | LIMIT ORDER | ORDERED | NONE | NONE |
| 1002 | 9999 | USD/JPY | 1000 | 2021/3/1 10:00 | BUY | 109.00 | 2999/12/31 23:59 | TORARIPI | 0.500 | 2500 | NEW | LIMIT ORDER | ORDERED | NONE | NONE |
| 1003 | 9999 | USD/JPY | 1000 | 2021/3/1 10:00 | BUY | 108.50 | 2999/12/31 23:59 | TORARIPI | 0.500 | 2500 | NEW | LIMIT ORDER | ORDERED | NONE | NONE |
| 1017 | 9999 | USD/JPY | 1000 | 2021/3/1 10:00 | BUY | 101.50 | 2999/12/31 23:59 | TORARIPI | 0.500 | 2500 | NEW | LIMIT ORDER | ORDERED | NONE | NONE |
| 1018 | 9999 | USD/JPY | 1000 | 2021/3/1 10:00 | BUY | 101.00 | 2999/12/31 23:59 | TORARIPI | 0.500 | 2500 | NEW | LIMIT ORDER | ORDERED | NONE | NONE |
| 1019 | 9999 | USD/JPY | 1000 | 2021/3/1 10:00 | BUY | 100.50 | 2999/12/31 23:59 | TORARIPI | 0.500 | 2500 | NEW | LIMIT ORDER | ORDERED | NONE | NONE |
| 1020 | 9999 | USD/JPY | 1000 | 2021/3/1 10:00 | BUY | 100.00 | 2999/12/31 23:59 | TORARIPI | 0.500 | 2500 | NEW | LIMIT ORDER | ORDERED | NONE | NONE |
| 1021 | 9999 | USD/JPY | 1000 | 2021/3/1 10:00 | SELL | 110.50 | 2999/12/31 23:59 | TORARIPI | 0.500 | 2500 | SETTLEMENT | LIMIT ORDER | UNORDERED | NONE | NONE |
| 1022 | 9999 | USD/JPY | 1000 | 2021/3/1 10:00 | SELL | 110.00 | 2999/12/31 23:59 | TORARIPI | 0.500 | 2500 | SETTLEMENT | LIMIT ORDER | UNORDERED | NONE | NONE |
| 1023 | 9999 | USD/JPY | 1000 | 2021/3/1 10:00 | SELL | 109.50 | 2999/12/31 23:59 | TORARIPI | 0.500 | 2500 | SETTLEMENT | LIMIT ORDER | UNORDERED | NONE | NONE |
| 1024 | 9999 | USD/JPY | 1000 | 2021/3/1 10:00 | SELL | 109.00 | 2999/12/31 23:59 | TORARIPI | 0.500 | 2500 | SETTLEMENT | LIMIT ORDER | UNORDERED | NONE | NONE |
| 1039 | 9999 | USD/JPY | 1000 | 2021/3/1 10:00 | SELL | 102.00 | 2999/12/31 23:59 | TORARIPI | 0.500 | 2500 | SETTLEMENT | LIMIT ORDER | UNORDERED | NONE | NONE |
| 1040 | 9999 | USD/JPY | 1000 | 2021/3/1 10:00 | SELL | 101.50 | 2999/12/31 23:59 | TORARIPI | 0.500 | 2500 | SETTLEMENT | LIMIT ORDER | UNORDERED | NONE | NONE |
| 1041 | 9999 | USD/JPY | 1000 | 2021/3/1 10:00 | SELL | 101.00 | 2999/12/31 23:59 | TORARIPI | 0.500 | 2500 | SETTLEMENT | LIMIT ORDER | UNORDERED | NONE | NONE |
| 1042 | 9999 | USD/JPY | 1000 | 2021/3/1 10:00 | SELL | 100.50 | 2999/12/31 23:59 | TORARIPI | 0.500 | 2500 | SETTLEMENT | LIMIT ORDER | UNORDERED | NONE | NONE |

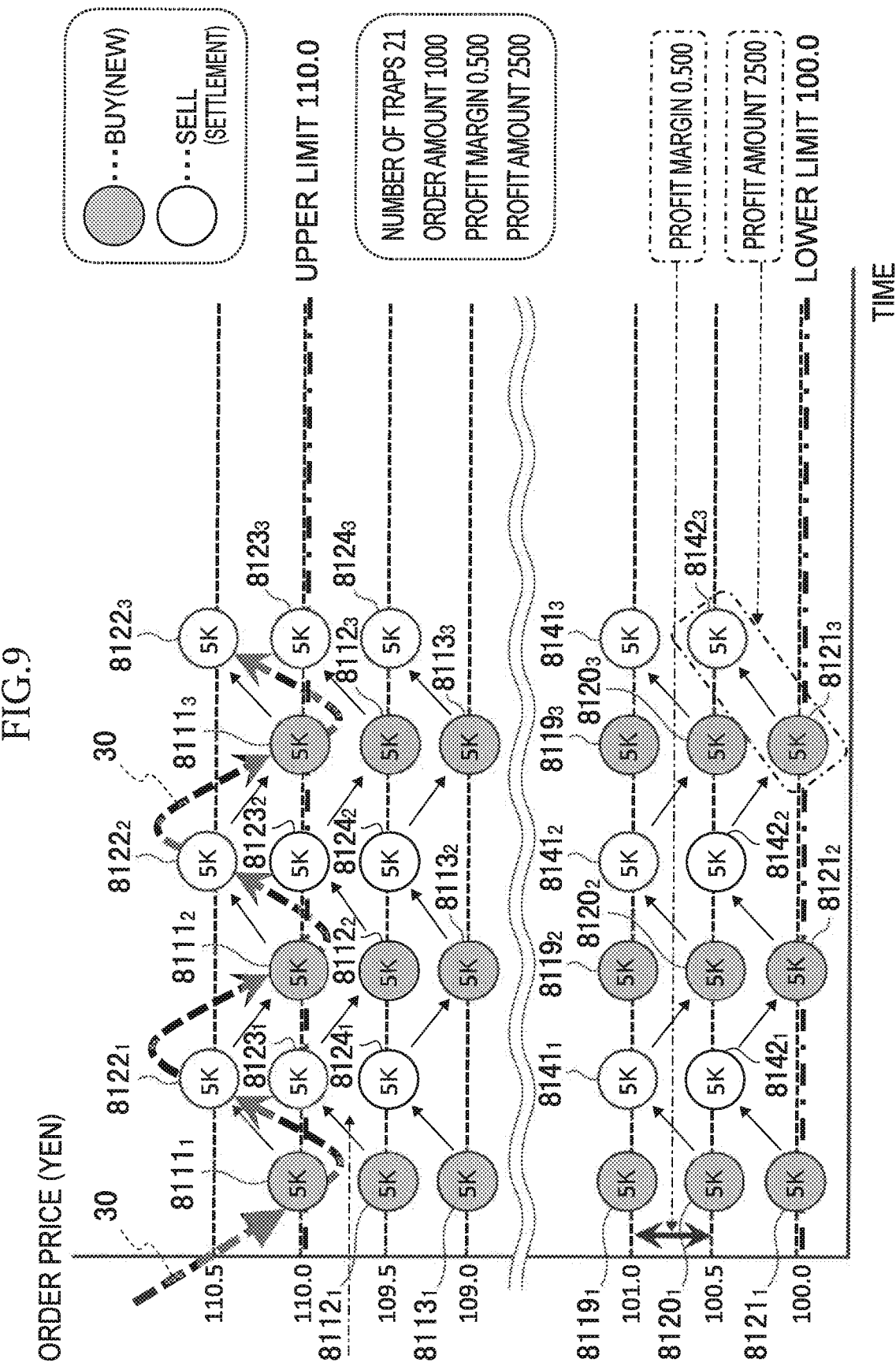

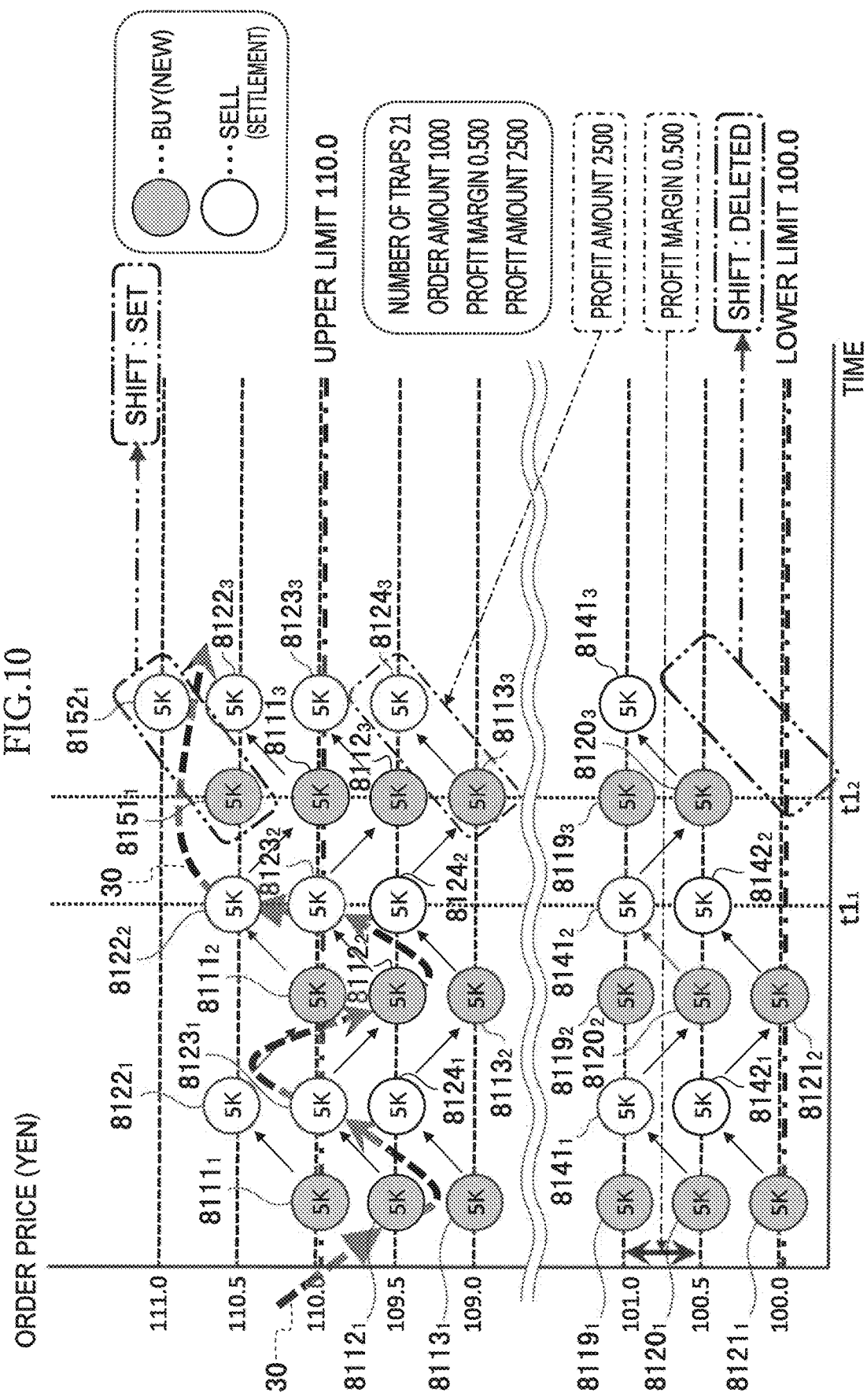

FIG.12

| ORDER NUMBER | CUSTOMER NUMBER | CURRENCY PAIR | ORDER AMOUNT | TRADE | ORDER PRICE | ORDER TYPE | PROFIT MARGIN | PROFIT AMOUNT | NEW/ SETTLEMENT | MARKET ORDER/ LIMIT ORDER/ STOP LIMIT ORDER | UNORDERED/ ORDERED/ CONTRACTED | SETTLEMENT TRAIL | STOP LOSS | TRAIL WIDTH | THROUGH PRICE RANGE |
|---|---|---|---|---|---|---|---|---|---|---|---|---|---|---|---|
| 1000 | 9999 | USD/JPY | 1000 | BUY | 110.00 | SETTLEMENT TRAIL | 0.500 | 2500 | NEW | STOP LIMIT ORDER | CONTRACTED | EXIST | EXIST | 0.000 | 0.500 |
| 1001 | 9999 | USD/JPY | 1000 | BUY | 109.50 | SETTLEMENT TRAIL | 0.500 | 2500 | NEW | STOP LIMIT ORDER | UNORDERED | EXIST | EXIST | 0.000 | 0.500 |
| 1002 | 9999 | USD/JPY | 1000 | BUY | 109.00 | SETTLEMENT TRAIL | 0.500 | 2500 | NEW | STOP LIMIT ORDER | UNORDERED | EXIST | EXIST | 0.000 | 0.500 |
| 1016 | 9999 | USD/JPY | 1000 | BUY | 102.00 | SETTLEMENT TRAIL | 0.500 | 2500 | NEW | STOP LIMIT ORDER | UNORDERED | EXIST | EXIST | 0.000 | 0.500 |
| 1017 | 9999 | USD/JPY | 1000 | BUY | 101.50 | SETTLEMENT TRAIL | 0.500 | 2500 | NEW | STOP LIMIT ORDER | ORDERED | EXIST | EXIST | 0.000 | 0.500 |
| 1018 | 9999 | USD/JPY | 1000 | BUY | 101.00 | SETTLEMENT TRAIL | 0.500 | 2500 | NEW | STOP LIMIT ORDER | ORDERED | EXIST | EXIST | 0.000 | 0.500 |
| 1019 | 9999 | USD/JPY | 1000 | BUY | 100.50 | SETTLEMENT TRAIL | 0.500 | 2500 | NEW | STOP LIMIT ORDER | ORDERED | EXIST | EXIST | 0.000 | 0.500 |
| 1020 | 9999 | USD/JPY | 1000 | BUY | 100.00 | SETTLEMENT TRAIL | 0.500 | 2500 | NEW | STOP LIMIT ORDER | ORDERED | EXIST | EXIST | 0.000 | 0.500 |
| 1021 | 9999 | USD/JPY | 1000 | SELL | 110.50 | SETTLEMENT TRAIL | 0.500 | 2500 | SETTLEMENT | STOP LIMIT ORDER | UNORDERED | EXIST | EXIST | 0.500 | 0.500 |
| 1022 | 9999 | USD/JPY | 1000 | SELL | 110.00 | SETTLEMENT TRAIL | 0.500 | 2500 | SETTLEMENT | STOP LIMIT ORDER | UNORDERED | EXIST | EXIST | 0.500 | 0.500 |
| 1023 | 9999 | USD/JPY | 1000 | SELL | 109.50 | SETTLEMENT TRAIL | 0.500 | 2500 | SETTLEMENT | STOP LIMIT ORDER | UNORDERED | EXIST | EXIST | 0.500 | 0.500 |
| 1038 | 9999 | USD/JPY | 1000 | SELL | 102.50 | SETTLEMENT TRAIL | 0.500 | 2500 | SETTLEMENT | STOP LIMIT ORDER | UNORDERED | EXIST | EXIST | 0.500 | 0.500 |
| 1039 | 9999 | USD/JPY | 1000 | SELL | 102.00 | SETTLEMENT TRAIL | 0.500 | 2500 | SETTLEMENT | STOP LIMIT ORDER | UNORDERED | EXIST | EXIST | 0.500 | 0.500 |
| 1040 | 9999 | USD/JPY | 1000 | SELL | 101.50 | SETTLEMENT TRAIL | 0.500 | 2500 | SETTLEMENT | STOP LIMIT ORDER | UNORDERED | EXIST | EXIST | 0.500 | 0.500 |
| 1041 | 9999 | USD/JPY | 1000 | SELL | 101.00 | SETTLEMENT TRAIL | 0.500 | 2500 | SETTLEMENT | STOP LIMIT ORDER | UNORDERED | EXIST | EXIST | 0.500 | 0.500 |
| 1042 | 9999 | USD/JPY | 1000 | SELL | 100.50 | SETTLEMENT TRAIL | 0.500 | 2500 | SETTLEMENT | STOP LIMIT ORDER | UNORDERED | EXIST | EXIST | 0.000 | 0.500 |
| 1043 | 9999 | USD/JPY | 1000 | SELL | 95.00 | SETTLEMENT TRAIL | 0.500 | 2500 | SETTLEMENT | STOP LIMIT ORDER | UNORDERED | EXIST | EXIST | 0.000 | 0.500 |

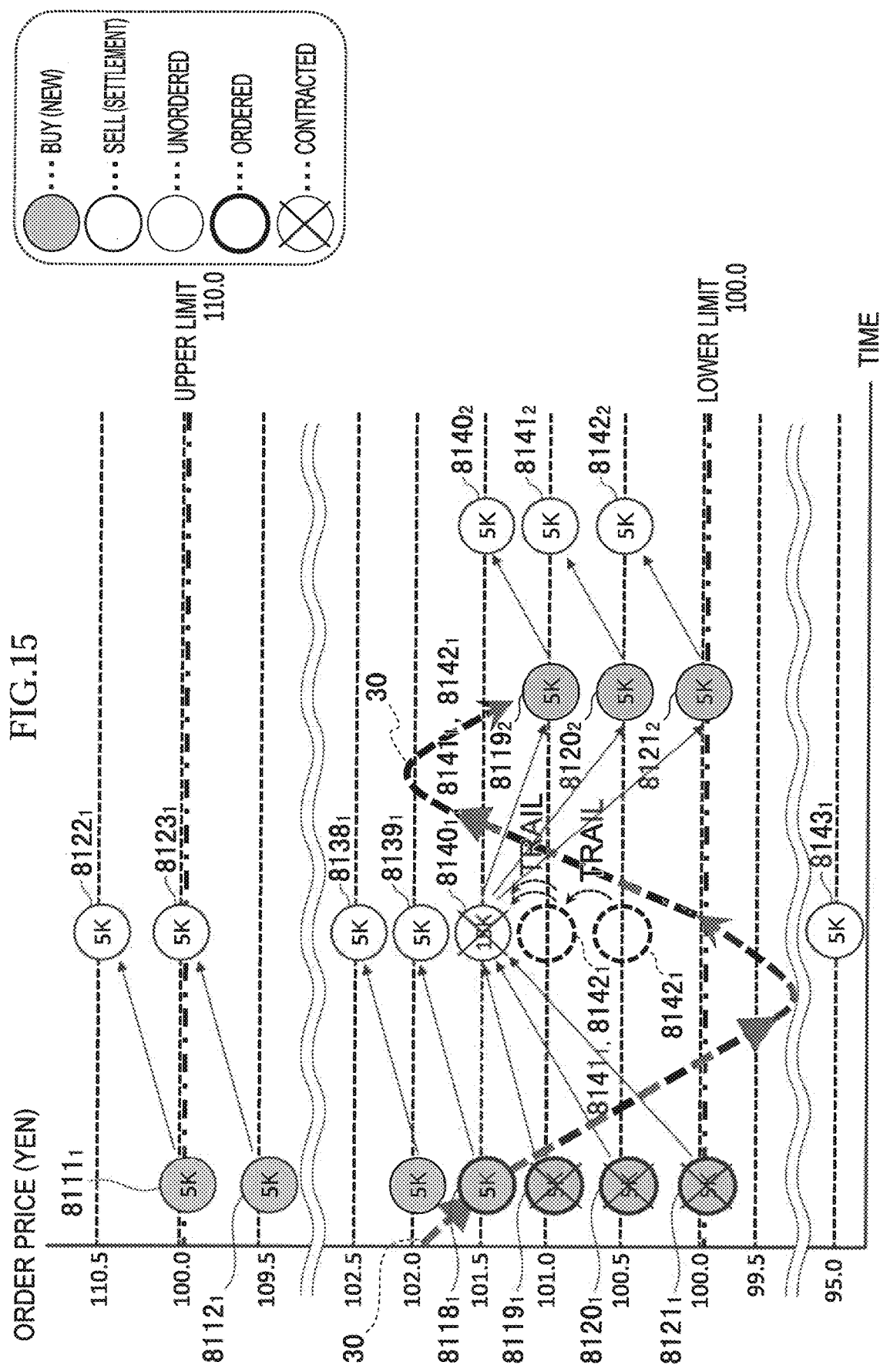

FINANCIAL PRODUCT TRANSACTION MANAGEMENT APPARATUS AND PROGRAM

This application is based upon and claims the benefit of priority of the prior Japanese Patent Application No. 2021-053579, filed on Mar. 26, 2021, which is incorporated herein by reference in its entirety.

BACKGROUND

1. Technical Field

The present invention relates to a technology for managing and assisting transactions of various financial products. The present invention can be applied to an apparatus or the like for managing and assisting transactions of various financial products.

2. Related Art

A market order (being in an order form in which trading is conducted at a quoted price at the time of order placement) and a limit order (being in a form in which trading is conducted when a quoted price becomes a predetermined price) are known as methods for trading various financial products each quoted price of which fluctuates, such as stocks, bonds, investment trusts, real estate investment trusts, commodities, foreign exchange, stock indices, crypto assets, etc. Conventionally, there has been known an invention in which a transaction according to these order forms, for example, a limit order, is conducted using a computer system (see, for example, Patent Document 1). That is, according to such an invention, an order for a financial product having a previously-set price as its position is placed, and when the market price of the financial product reaches this price, the order is made to be contracted, thereby causing the transaction to be conducted.

LIST OF DOCUMENTS

Patent Documents

Patent Document 1: Japanese Patent Application Publication No. 2006-99787

SUMMARY

Technical Problem

Here, when the computer system is used to conduct a transaction of a first order and a second order corresponding thereto, order price setting is important to obtain profit. Conventionally, it is general to set order prices of the first order and the second order based on a profit amount and the like of the first order and the second order.

However, regarding such order price setting based on a profit amount and the like, it is difficult to set an order price to a price or into a price range appropriate for the transaction if a trader who conducts a transaction of a financial product is not familiar with the type of the financial product and a trend in market fluctuation for each financial product. A special configuration for convenience in order price setting is not disclosed in Patent Document 1. According to Patent Document 1, there has been a problem that order price setting to a price or into a price range appropriate for a transaction is difficult if a trader is not familiar with the type of the financial product and the trend in market fluctuation for each financial product.

It is an object of the present invention to provide a financial product transaction management apparatus capable of easily realizing setting of an order price desired by a user and setting of an order price having a high possibility of obtaining profit through a transaction in a case of setting order prices for conducting the transaction of a first order and a second order corresponding thereto in the transaction of a financial product conducted using a computer system.

To solve such problems, the present invention according to a first aspect provides a financial product transaction management apparatus for conducting trading of a financial product including an order information generation unit configured to generate order information as information for conducting trading of the financial product. Here, the order information generation unit includes a profit amount calculation unit configured to calculate, by calculation, a profit amount to be obtained through a transaction of one first order and one second order, for the financial product, among first orders each being an order to be traded antecedently and second orders each being an order to be traded subsequently to the corresponding first order, based on profit margin setting information for setting a profit margin as a size of profit to be obtained through the transaction of the one first order and the one second order, and order amount setting information for setting an order amount of the one first order and/or an order amount of the one second order.

The present invention according to a second aspect provides a financial product transaction management apparatus for conducting trading of a financial product including an order information generation unit configured to generate order information as information for conducting trading of the financial product. Here, the order information generation unit includes a profit margin calculation unit configured to calculate, by calculation, a profit margin as a size of profit to be obtained through a transaction of one first order and one second order, for the financial product, among first orders each being an order to be traded antecedently and second orders each being an order to be traded subsequently to the corresponding first order, based on profit amount setting information for setting a profit amount to be obtained through the transaction of the one first order and the one second order, and order amount setting information for setting an order amount of the one first order and/or an order amount of the one second order.

According to a third aspect of the present invention, in addition to the configuration of the first or second aspect, the order information generation unit includes a profit margin change unit configured to generate the order information by changing the profit margin of the financial product to another profit margin based on profit margin changing information for changing the previously-set profit margin to the other profit margin, and the profit margin change unit changes the profit margin based on the profit margin changing information in a state in which the profit amount is fixed to a specific amount.

According to a fourth aspect of the present invention, in addition to the configuration of the first or second aspect, the order information generation unit includes a profit amount change unit configured to generate the order information by changing the profit amount of the financial product to another profit amount based on profit amount changing information for changing the previously-set profit amount to the other profit amount, and the profit amount change unit changes the profit amount based on the profit amount changing information in a state in which the profit margin is fixed to a specific margin.

According to a fifth aspect of the present invention, in addition to the configuration of the first or second aspect, the order information generation unit includes a profit margin change unit configured to generate the order information by changing the profit margin of the financial product to another profit margin based on profit margin changing information for changing the previously-set profit margin to the other profit margin and a profit amount change unit configured to generate the order information by changing the profit amount of the financial product to another profit amount based on profit amount changing information for changing the previously-set profit amount to the other profit amount. Here, the order information generation unit performs any of processing of the profit margin change unit to change the profit margin in a state in which the profit amount is fixed to a specific amount and processing of the profit amount change unit to change the profit amount in a state in which the profit margin is fixed to a specific margin.

According to a sixth aspect of the present invention, in addition to the configuration of any one of the first to fifth aspects, the order information generation unit includes an order price range/profit margin setting unit configured to set each of order price ranges, as price ranges of the first orders and/or price ranges of the second orders, and the profit margin of the one first order and the one second order corresponding to the one first order to be the same, when the first orders are set to different order prices and the second orders are set to different order prices, respectively.

According to a seventh aspect of the present invention, in addition to the configuration of any one of the first to sixth aspects, the order information generation unit generates the order information for automatically conducting a transaction of the first orders set to different order prices and/or the second orders set to different order prices.

According to an eighth aspect of the present invention, in addition to the configuration of any one of the first to seventh aspects, the order information generation unit generates the order information for automatically repeating a transaction of the first order and the second order corresponding to the first order a plurality of times.

The present invention according to a ninth aspect provides a program configured to cause a computer to function as the financial product transaction management apparatus according to any one of the first to eighth aspects.

The first aspect of the present invention has the configuration in which the profit amount to be obtained through the transaction of one first order and one second order is calculated by calculation based on profit margin setting information for setting a profit margin as a size of profit to be obtained through the transaction of the one first order and the one second order and order amount setting information for setting an order amount of the one first order and/or the order amount of the one second order. Accordingly, when the information for setting the profit margin is obtained, the profit amount can be calculated and set based on the information. Therefore, it is possible to set the order amounts and the order prices of the first order and the second order based on the information of the profit margin. Then, each of the first order and the second order can be easily set to the order price and the order amount for easily obtaining profit by causing a user of the financial product transaction apparatus or the like to input information of the desired profit margin, and the like. Accordingly, it is possible to easily realize setting of an order price desired by a user and setting of an order price having a high possibility of obtaining profit through a transaction in a case of setting order prices for conducting the transaction of the first order and the second order corresponding thereto in the transaction of the financial product conducted using a computer system.

The second aspect of the present invention has the configuration in which the profit margin to be obtained through the transaction of one first order and one second order is calculated by calculation based on profit amount setting information for setting a profit amount to be obtained through the transaction of the one first order and the one second order and order amount setting information for setting an order amount of the one first order and/or the order amount of the one second order. Accordingly, when the information for setting the profit amount is obtained, the profit margin can be calculated and set based on the information. Therefore, it is possible to set the order amounts and the order prices of the first order and the second order based on the information of the profit amount. Then, each of the first order and the second order can be easily set to the order price and the order amount for easily obtaining profit by causing a user of the financial product transaction apparatus or the like to input information of the desired profit amount, and the like. Accordingly, it is possible to easily realize setting of an order price desired by a user and setting of an order price having a high possibility of obtaining profit through a transaction in a case of setting order prices for conducting the transaction of the first order and the second order corresponding thereto in the transaction of the financial product conducted using a computer system.

According to the third aspect of the present invention, the order information is generated by changing the profit margin from a profit margin to another profit margin with the profit amount fixed to a specific amount based on the profit margin changing information for changing the previously-set profit margin to the other profit margin. Accordingly, the user can easily set the order prices and the order amounts of the first order and the second order to the order prices and the order amounts desired by the user while changing the previously-set profit margin with operation or the like of the user in a state in which the change parameter is only the profit margin as being easy for the user to understand the content of change.

According to the fourth aspect of the present invention, the order information is generated by changing the profit amount from a profit amount to another profit amount with the profit margin fixed to a specific margin based on the profit amount changing information for changing the previously-set profit amount to the other profit amount. Accordingly, the user can easily set the order prices and the order amounts of the first order and the second order to the order prices and the order amounts desired by the user while changing the previously-set profit amount with operation or the like of the user in a state in which the change parameter is only the profit amount as being easy for the user to understand the content of change.

According to the fifth aspect of the present invention, it is possible to perform any of processing to change the profit margin in a state in which the profit amount is fixed to a specific amount and processing to change the profit amount in a state in which the profit margin is fixed to a specific margin. Accordingly, it is possible to enable a user to select either setting of an order price of the setting of the order price based on a profit margin and the setting of the order price based on a profit amount, with the content of change of which being easy for the user to understand. Accordingly, it is possible to provide a financial product transaction management apparatus which is highly convenient for a user while increasing the number of variations of methods in order price setting.

According to the sixth aspect of the present invention, by setting the order price range and the profit margin to be the same, it is possible to provide a state in which the content of setting or changing the order price range and the profit margin can be easily understood by the user. Accordingly, it is possible to provide a financial product transaction management apparatus which is highly convenient for a user.

According to the seventh aspect of the present invention, it is possible to realize a state in which the order prices of a plurality of first orders set to different order prices and/or a plurality of second orders set to different order prices can be easily set as the order prices desired by the user or the order prices having a high possibility of obtaining profit from the transaction. Accordingly, it is possible to provide a financial product transaction management apparatus which is highly convenient for a user.

According to the eighth aspect of the present invention, it is possible to realize a state in which the order price of the first order or the second order when the transaction of the first order and the second order corresponding to the first order is automatically repeated a plurality of times can be easily set as the order price desired by the user or the order price having a high possibility of obtaining the profit through the transaction.

According to the invention described in the claims, the present invention can be constructed in various computers and various computer systems.

BRIEF DESCRIPTION OF DRAWINGS

FIG. 1 is a system configuration diagram and a functional block diagram of a financial product transaction management system according to a first embodiment.

FIG. 2 is a table showing a field definition of an order table to be stored in the financial product transaction management system.

FIGS. 4A and 4B are diagrams each showing an order input screen displayed at a client terminal in the financial product management system and the financial product management apparatus, while FIG. 4A schematically shows a state in which calculation using default values is performed with a profit margin input selection button selected and FIG. 4B schematically shows a state in which calculation is performed after a value of an order amount is changed from the fault value with the profit margin input selection button selected.

FIGS. 5A and 5B are diagrams each showing an order input screen displayed at a client terminal in the financial product management system and the financial product management apparatus, while FIG. 5A schematically shows a state in which calculation using default values is performed with a profit amount input selection button selected and FIG. 5B schematically shows a state in which calculation is performed after a value of an order amount is changed from the fault value with the profit amount input selection button selected.

FIGS. 6A and 6B are charts in the financial product management system and the financial product management apparatus, while FIG. 6A schematically shows a transaction figure of first orders and second orders when order information is generated from a state of the order input screen shown in FIG. 4A and FIG. 6B schematically shows a transaction figure of first orders and second orders when order information is generated from a state of the order input screen shown in FIG. 4B.

FIGS. 7A and 7B are charts in the financial product management system and the financial product management apparatus, while FIG. 7A schematically shows a transaction figure of first orders and second orders when order information is generated from a state of the order input screen shown in FIG. 5A and FIG. 7B schematically shows a transaction figure of first orders and second orders when order information is generated from a state of the order input screen shown in FIG. 5B.

FIG. 8 is a table schematically showing an order information group generated by an order information generation unit when inputting is performed in a state shown in FIG. 4B in the financial product management system and the financial product management apparatus.

FIG. 9 is a chart schematically showing a transaction figure conducted according to order information generated based on processing in the financial product management system and the financial product management apparatus.

FIG. 10 is a chart schematically showing a transaction figure accompanied with a "shift function" conducted according to order information generated based on processing in the financial product management system and the financial product management apparatus.

FIG. 12 is a table schematically showing an order information group generated by the order information generation unit in the financial product management system and the financial product management apparatus.

FIG. 15 is a chart schematically showing a transaction figure of the "settlement trail" performed according to order information generated based on processing in the financial product management system and the financial product management apparatus.

DESCRIPTION OF EMBODIMENTS

First Embodiment

Figure 3:
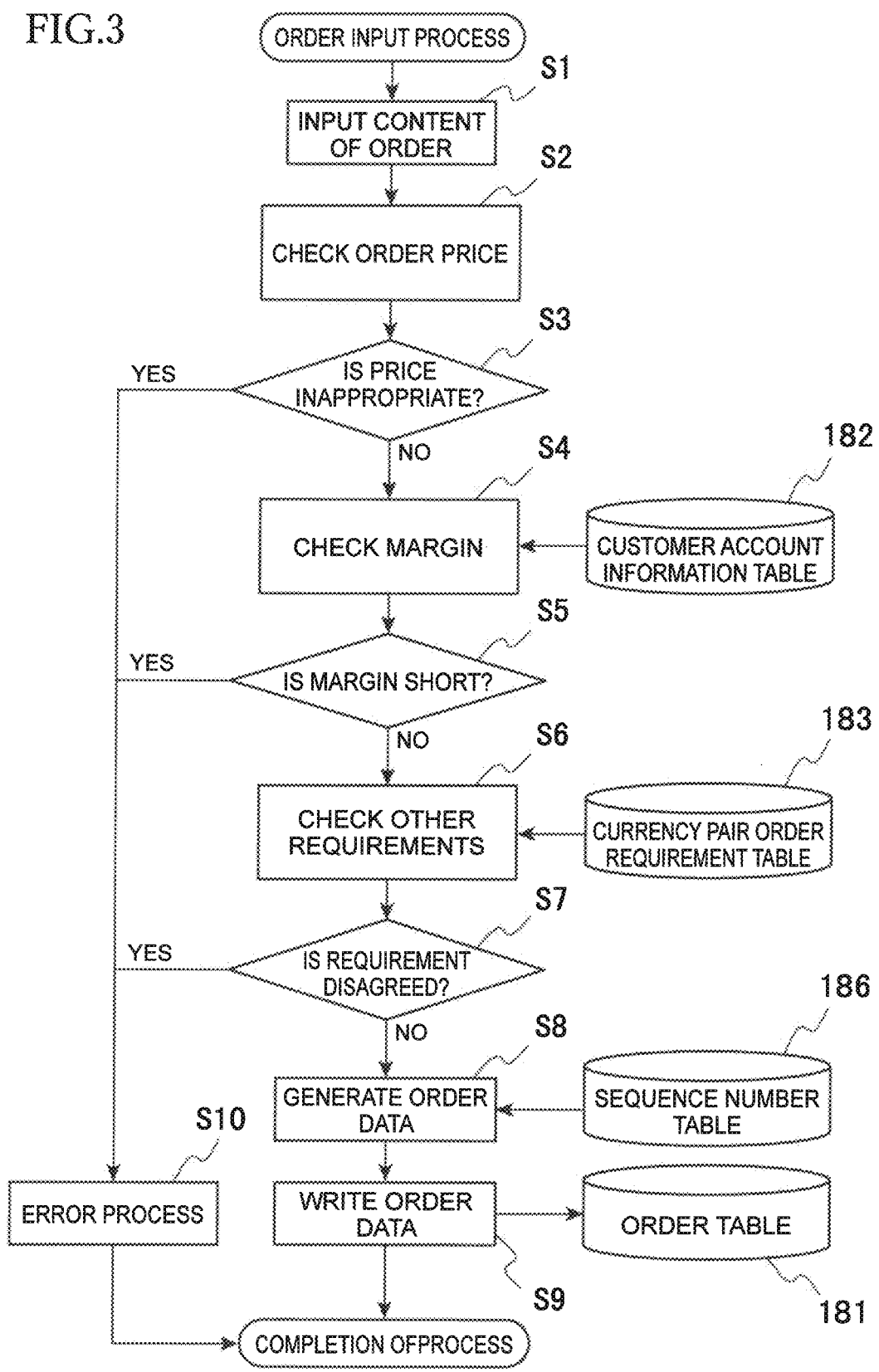
FIG. 3 is a flowchart showing a procedure of the financial product transaction management system and a financial product transaction management apparatus according to the first embodiment.

Hereinafter, a first embodiment of the present invention will be described with reference to the drawings.
[System Configuration]
FIGS. 1 to 9 show the first embodiment of the present invention.

FIG. 1 is a system configuration diagram and a functional block diagram of a financial product transaction management system according to the first embodiment. As shown in FIG. 1, a financial product transaction management system 1A includes a financial product transaction management apparatus 1 and N (N≥1) client terminals 2₁ to 2ₙ, and the financial product transaction management apparatus 1 can communicate with each of the client terminals 2₁ to 2ₙ via the Internet 3 as a wide area network (WAN). The financial product transaction management system 1A according to the first embodiment handles foreign exchange as a financial product.

The financial product transaction management apparatus 1 is a server computer managed and operated by a financial product dealer, and has a Web server function and a database function for storing a large volume of data. The client terminals 2₁, . . . , 2ₙ are communication terminals, such as personal computers and mobile phone terminals, each having a data communication function to be held and used by individuals or companies who trade financial products. The client terminals 2₁, . . . , 2ₙ include, respectively, operation units 21₁, . . . , 21ₙ used for inputting various instructions such as a mouse and a keyboard, and display units 22₁, . . . , 22ₙ including a liquid crystal display (LCD) or the like for displaying various instructions and various images input from the operation units 21₁, . . . , 21ₙ. The operation units 21₁, . . . , 21ₙ and the display units 22₁, . . . , 22ₙ of the client terminals 2₁, . . . , 2ₙ may be configured as touch panel type displays each for performing various inputs based on coordinate information and the like of the contact position of a finger or a pointing device such as a touch pen. Since the client terminals 2₁, . . . , 2ₙ, the operation units 21₁, . . . , 21ₙ, and the display units 22₁, . . . , 22ₙ have the same configuration, respectively, the client terminal 2, the operation unit 21, and the display unit 22 are used in the following except in cases in which distinction thereof is required.

Although not shown in FIG. 1, each of the financial product transaction management apparatus 1 and the client terminal 2 is provided with at least one central processing unit (CPU), a random access memory (RAM) which functions as a work area of the CPU, a read only memory (ROM) in which a boot program for starting and the like are stored, an auxiliary storage device such as a hard disk in which various programs and data are stored, a communication interface used for transmitting and receiving data, and the like. In the auxiliary storage device, an operating system (OS) program, various application programs, data stored in a database, and the like are stored, and these programs and data realize various functions in cooperation with hardware resources by arithmetic processing of the CPU.

The financial product transaction management apparatus 1 may be configured by one server computer or a plurality of network computer systems. Further, the financial product transaction management apparatus 1 may be a system configured by a plurality of pieces of hardware existing on the Internet 3, such as a cloud computer system.

As shown in FIG. 1, the financial product transaction management apparatus 1 includes a data processing unit 10 as a functional unit realized based on the above-described various programs and hardware resources, and a database 18 in which various data to be processed by the data processing unit 10 are stored. The data processing unit 10 performs processing such as generating and processing of various data used in the financial product transaction management apparatus 1, and further includes, as functional units, a front page distribution unit 11, an order input reception unit 12, a deposit/withdrawal information generation unit 13, a contract information generation unit 14 as a "contract information generation unit", an account information generation unit 15, an order information generation unit 16 as an "order information generation unit", a database (DB) connection base unit 17, and a price information reception management unit 19.

The order input reception unit 12 receives data relating to various orders input from the client terminal 2, and performs various processing necessary for establishing an order of a financial product. Further, the order input reception unit 12 calculates the amount of margin required for a transaction of a financial product.

The deposit/withdrawal information generation unit 13 receives deposit/withdrawal requests from the client terminal 2 and creates a deposit/withdrawal list based on the requests.

Based on the information processed by the order input reception unit 12, the order information generation unit 16 generates information relating to the established order of the financial product. The order here includes an if-done order in addition to, as being called, a market order, a limit order, and a stop limit order.

When generating an if-done order and a stop limit order, the order information generation unit 16 generates order information of a first order such that the first order is a new limit order or a new stop limit order, generates order information of a second order such that the second order is a limit order of settlement, and generates order information of the stop limit order such that the stop limit order is a stop limit order of settlement. The first order, the second order, and the stop limit order are distinguished and recorded in accordance with field definitions of an order table 181 described later.

The order information generation unit 16 has a function as a "profit amount calculation unit" which calculates a profit amount (described later) to be obtained through the transaction of one first order and one second order by calculation based on profit margin setting information for setting a profit margin as a size of profit to be obtained through the transaction of the one first order and the one second order and order amount setting information for setting an order amount of the one first order and/or the order amount of the one second order. Further, the order information generation unit 16 has a function as a "profit margin calculation unit" which calculates a profit margin as a size of profit to be obtained through the transaction of one first order and one second order by calculation based on profit amount setting information for setting a profit amount to be obtained through the transaction of the one first order and the one second order and order amount setting information for setting an order amount of the one first order and/or the order amount of the one second order.

The order information generation unit 16 also has a function as a "profit margin change unit" which generates the order information by changing a profit margin (described later) of a financial product from the one profit margin to another profit margin based on profit margin changing information for changing the previously-set profit margin to the other profit margin.

The order information generation unit 16 also has a function as a "profit amount change unit" which generates the order information by changing the profit amount (described later) of the financial product from one profit amount to another profit amount based on profit amount changing information for changing the previously-set profit amount to the other profit amount.

Further, the order information generation unit 16 has a function as an "order price range/profit margin setting unit" which sets each of the order price ranges, as price ranges of first orders and/or price ranges of second orders, and the profit margin of one first order and one second order corresponding to the one first order to be the same, when the first orders are set to different order prices and the second orders are set to different order prices, respectively.

The contract information generation unit 14 performs a contract process based on the order generated by the order information generation unit 16 and a process of sending information on the completed contract process to the client terminal 2 of a trader. The term "contract" used herein refers to various procedures and processes for establishing trading of financial products based on an order of a trader. As will be described later, when a contract is established in the first embodiment, trading of foreign exchange is conducted. As a result, the account information generation unit 15 converts margin information (described later) in accordance with a trading amount based on an instruction of the contract information generation unit 14, and further, the deposit/withdrawal information generation unit 13 records the status of deposits and withdrawals on a deposit/withdrawal list. When the contract is established, the contract information generation unit 14 causes the display unit 22 of the client terminal 2 to display character information or the like indicating that the contract is established, and also performs a credit process of a bank account of the client terminal 2 based on the trading price.

The account information generation unit 15 has a function of generating deposit balance information of a trader and managing the deposit balance information as margin information (i.e., information for confirming that an order contract can be realized). The information on the deposit balance generated by the account information generation unit 15 is periodically collated with information on the actual deposit balance of a trader provided by a financial institution such as a bank to be consistent with the actual deposit balance.

The database connection base unit 17 performs conversion (e.g., interchange conversion between a logical data structure and a physical data structure) between data generated and processed by the data processing unit 10 and the data recorded in the database 18, and performs processing necessary for data communication between the data processing unit 10 and the database 18.

The database 18 records data to be used in the financial product transaction management apparatus 1. Although the database 18 in the first embodiment is formed by a relational database, any form suitable for recording and rewriting a large amount of data, such as an object database, may be used. The database 18 includes data recorded in an order table 181, a customer account information table 182 defining information such as a financial institution in which an account of a trader exists, an account name, and a balance, a currency pair order condition table 183 defining information relating to a combination of currencies to be traded and the like, and a sequence number table 184. A sequence number uniquely assigned to each order information (described later) is recorded in the sequence number table 184. Details of the order table 181 will be described later.

The front page distribution unit 11 creates image data to be displayed on the display unit 22 of the client terminal 2 and transmits the created image data to the client terminal 2.

The price information reception management unit 19 obtains information on a price of a financial product handled by the financial product transaction management apparatus 1, and performs processing and management necessary for use by the data processing unit 10 on the obtained information. In the first embodiment, the price information reception management unit 19 periodically obtains, records, and manages information on the market price for foreign exchange.

Although not shown, the financial product transaction management apparatus 1 has a timer for obtaining and managing date and time information, and a time limit management unit for managing time limits of a first order, a second order, and a stop limit order based on the date and time information obtained from the timer.

FIG. 2 is a schematic diagram of the field definition of the order table 181. As shown in FIG. 2, the order table 181 has fields corresponding to the number of items, and defines the name of the field (field name), data type (type) such as a character, a numerical value, or date and time, data length (length) such as bit length, non-blank designation (Not Null), presence or absence of a default value (default value), item name of data (note), and the like.

[Order Type]

In the first embodiment, according to the order information generation unit 16, the first order and the second order in various transaction forms described later can be conducted as any order type based on generated order information. Specifically, for example, the order information generation unit 16 can generate order information that the first order and the second order are conducted as any of a market order, a limit order, and a stop limit order.

More specifically, for example, the order information generation unit 16 can generate order information such that contract is conducted when the market price matches a specific order price as a limit order. Similarly, for example, the order information generation unit 16 can generate order information such that contract is conducted when the market price matches a specific order price as a stop limit order. Furthermore, the order information generation unit 16 can generate order information such that a market order is placed when the market price reaches a specific price to conduct the market order which is to be contracted at a price equal to or close to the specific price (hereinafter, simply referred to as "trigger market").

Similarly, the order information generation unit 16 can generate order information such that the first order or the second order in various types of transactions described later is conducted as a limit order, a stop limit order (e.g., a configuration is considered in which contract is conducted when the market price rises (or falls) to coincide with the contract price of the first order or the second order again after the market price once falls (or rises) across the contract price), or trigger market. The order information generation unit 16 may also generate order information such that the first order and the second order are configured by a combination of different types of orders (e.g., the first order is a market order and the second order is a limit order).

In the first embodiment, the order information generation unit 16 can generate order information such that one or both of the first order and the second order in various types of transaction forms described later have a trail function in which the contract price changes in accordance with fluctuation in the market price.

Further, in the first embodiment, the order information generation unit 16 can generate order information such that one or both of the first order and the second order in the various transaction forms described later are reversed in order of a buy order and a sell order after the buy order and the sell order have been contracted (e.g., after a buy order of the first order and a sell order of the second order are placed and contracted, a sell order of the first order and a buy order of the second order are placed and contracted, and then a buy order of the first order and a sell order of the second order are placed and contracted, and so on).

Further, in the first embodiment, in addition to the first order and the second order in the various transaction forms described later, the order information generation unit 16 can generate a stop loss order (stop limit order) which is an order for suppressing a large loss due to a rapid fall or a rapid rise in the market (described later in the second embodiment of present invention; see FIGS. 13 to 15). The stop loss order may be set for each order, for each first order, for each second order, or for all orders, or one stop loss order may be set all orders, all first orders, or all second orders. Also, when the stop loss order is contracted, all subsequent orders and transactions of all first and second orders may be canceled (transactions may be forcibly terminated), or some or all transactions may be continued on a condition basis. The stop loss order can also be set by manual operation of the user of the client terminal 2 by displaying a stop loss selection button 118 and a stop loss price input field 119 shown on an order input screen 100 (see FIG. 11) of a second embodiment of present invention described later on the order input screen 100 (see FIGS. 4 and 5) of the first embodiment described later.

In addition, in the first embodiment, there may be provided a "shift function" in which, based on fluctuation in the market price and the contract of a particular order, an order may be placed at a new order price higher or lower than the order price of an order that has already been placed or an order that is scheduled to be ordered, and an order that has already been placed or an order that is scheduled to be placed at an order price that is farthest from the fluctuation side of the market price may be eliminated. The "shift function" will be described later (see FIG. 10).

[Transaction Form in First Embodiment]

In the first embodiment, a case will be described in which a financial product transaction management system 1A is applied to the transaction method described below. Here, in the first embodiment, the financial product transaction management system 1A may be applied to any other transaction method.

In the first embodiment, the financial product transaction management system 1A is applied to a transaction method called "RAKUTRA", and the order information generation unit 16 of the financial product transaction management apparatus 1 generates order information for conducting a transaction by "RAKUTRA".

"RAKUTRA" is an ordering method for setting a first order and a second order to conduct a transaction as "trap repeat if-done" described below in a price range set between a predetermined upper limit price and a predetermined lower limit price, or in a price range set based on the upper limit price and the lower limit price.

Here, "trap repeat if-done" realized in "RAKUTRA" is a transaction in which, for a plurality of financial products of the same type, combinations (if-done orders) each having a first order and a second order placed by contract of the first order exist, the price range of the first orders and the price range of the second orders are set to be constant, and the profit margin of each first order and the corresponding second order (hereinafter, referred to as a "profit amount") is set constant, and when the first order and the corresponding second order are contracted, the if-done order is repeated with a new first order corresponding to the contracted first order and a new second order corresponding to the contracted second order (hereinafter, referred to simply as the "trap repeat if-done").

In the first embodiment, the order information generation unit 16 generates order information for realizing the "trap repeat if-done" by "RAKUTRA". That is, the order information generation unit 16 generates order information for conducting a transaction of the first order and the second order in the price range set between the predetermined upper limit price and the predetermined lower limit price, or in the price range set based on the upper limit price and the lower limit price.

The upper limit price and the lower limit price may be the same price. In this case, the order information generation unit 16 generates first order information and second order information for conducting the transaction of the first order at one order price and the second order at the one order price, in which the number of traps is one.

In the first embodiment, the upper limit price and the lower limit price for realizing "RAKUTRA" may be set, for example, by the order information generation unit 16 using numerical values input by a trader, or by the order information generation unit 16 performing predetermined calculation based on the highest price and the lowest price of the market price in a predetermined period.

Alternatively, for example, the upper limit price and the lower limit price for realizing "RAKUTRA" may be set based on the market price when the order information generation unit 16 generates order information. The market price in this case may be the market price at the moment when an order button (not shown) on a confirmation screen (not shown) is clicked or the market price at the moment when a confirmation button 115 on the order input screen 100 is clicked, or the market prices at the moment when both the buttons are each clicked with the order information may be applied separately. For example, the upper limit price or the lower limit price when an order information group 18100 (described later) to be generated for the first time may be the market price at the moment when the confirmation button 115 on the order input screen 100 is clicked, and the upper limit price or the lower limit price when the order information group 18100 (described later) to be generated for the second time and thereafter may be the market price at the moment when an execution button (not shown) on a confirmation screen (not shown) is clicked. Further, the upper limit price and the lower limit price may be set by any method other than the above-described configuration.

The price range for realizing "RAKUTRA" may be set, for example, by the order information generation unit 16 using numerical values such as the upper limit price and the price range or the lower limit price and the price range input by the trader, or by the order information generation unit 16 performing predetermined calculation based on a fluctuation range of the market price in a predetermined period. The setting may be performed by any other method.

As a procedure for setting the order price of each of the first orders and the second orders in "RAKUTRA", for example, the order information generation unit 16 may set the order price of each order such that the highest order price and the lowest order price of "trap trade" match the upper limit price and the lower limit price of the price range, respectively, or set the order price of each order such that the center value of the price range matches the average value of all the order prices.

For example, as a procedure for setting each order price in "RAKUTRA", the order information generation unit 16 may set the order prices of the first orders and the second orders such that the order price of the highest first order or the order price of the highest second order and the order price of the lowest first order or the order price of the lowest second order in "trap repeat if-done" match the upper limit price and the lower limit price of the price range, respectively, or such that the order price of the lowest first order matches the lower limit price of the price range and the order price of the highest second order matches the upper limit price of the price range.

Further, for example, as a procedure for setting each order price in "RAKUTRA", the order information generation unit 16 may set the order prices of the first orders such that the center value of the price range matches the average value of the order prices of all the first orders, or may set the order prices of the second orders such that the center value of the price range matches the average value of the order prices of all the second orders.

It should be noted that "trap repeat if-done" of the first embodiment realized in "RAKUTRA" of the first embodiment can also have various variations other than the above-described methods.

For example, as a variation of "trap repeat if-done", the price range of financial products according to the order information generated by the order information generation unit 16 does not need to be always constant. A price range between specific orders, for example, the highest first order and the next highest first order or a price range between the highest second order and the next highest second order, and a price range between the lowest first order and the next lowest first order or a price range between the lowest second order and the next lowest second order may be different from a fixed price range between first orders at other order prices. Only a predetermined set of the first orders or only a predetermined set of the second orders may have the same price range, such as the highest first order and the second highest first order, the third highest first order and the fourth highest first order, and so on, or the highest second order and the second highest second order, the third highest second order and the fourth highest second order, and so on.

Further, for example, as a variation of "trap repeat if-done", a new first order and a new second order according to order information generated by the order information generation unit 16, which appear after a specific first order and a second order corresponding to the first order are respectively contracted, do not need to be at the same order amounts and order prices of the original first order and the original second order, respectively. For example, after a specific first order and a specific second order are contracted, a new first order and a new second order may be placed respectively at a price higher (or lower) than the order price of the original first order and the order price of the original second order by a predetermined price (e.g., 0.1 yen each), or a new first order and a new second order may be placed respectively at an order quantity increased (or decreased) by a predetermined order quantity (e.g., 0.1 currency units) than the order quantity of the original first order and the order quantity of the original second order.

Further, for example, as a variation of "trap repeat if-done", a new first order and a new second order may be placed in the fluctuation direction of the market price based on the order information generated by the order information generation unit 16 after a specific first order and a second order corresponding to the first order are contracted in accordance with the market price fluctuation or the like.

Further, for example, as a variation of "trap repeat if-done", the order information generation unit 16 may generate new order information such that a new first order is placed on a higher price side than the highest first order and a new second order is placed on a higher price side than the highest second order after the highest first order and the highest second order are contracted in accordance with market price fluctuation. In this case, the price range between the newly generated first order and the original highest first order or the price range between the newly generated second order and the original highest second order may be the same as or different from the price range between the original first orders or the price range between the original second orders (e.g., a price range calculated by a predetermined calculation based on the market price fluctuation in the latest predetermined period). Further, the profit margin of the newly generated first order and the newly generated second order may be the same as or different from the profit margin of the original first order and the original second order.

Further, "trap repeat if-done" realized in "RAKUTRA" of the first embodiment may be an order method in which a plurality of first orders set at a plurality of order prices or a plurality of second orders set at a plurality of order prices realize one if-done order (hereinafter, referred to as "trap trade"), or an order method in which an if-done order conducted by a first order at one order price and a second order at one order price is repeated (hereinafter, referred to as "repeat if-done").

When "trap trade" is realized in the first embodiment, the price range between financial products does not need to be always constant. A price range between specific orders, for example, the highest order and the next highest order or a price range between the lowest order and the next lowest order may be different from a fixed price range between orders at other order prices. Only a predetermined set of the orders may have the same price range, such as the highest order and the second highest order, the third highest order and the fourth highest order, and so on.

Further, when "repeat if-done" is realized in the first embodiment, order prices of the first orders and order prices of the second orders do not need to be always the same, respectively. The order prices may be changed according to predetermined regularity or randomly every time the first order and the second order are repeated, or the order prices of the first order and the second order may be changed based on an increase or a decrease in the market price after the start of the transaction.

In "trap repeat if-done", "trap trade", or "repeat if-done" realized by the above-described "RAKUTRA", the order quantity for each order price and the order quantity of the first order and the second order stay constant from the order placement to the contract in principle. Hereinafter, a case in which a transaction is conducted with such an order quantity will be described.

However, in the first embodiment, the order quantity may be changed in a period from order placement to contract. For example, the order amount at the time of the order placement is "1000", but may be changed with the fluctuation of the market price, and the order amount at the time of the contract may be "1100".

[Processing Procedure (Generation of Order Information)]

FIG. 3 is a flowchart showing a processing procedure of the financial product transaction management apparatus 1 according to the first embodiment. Hereinafter, the processing procedure of the first embodiment will be described with reference to the flowchart.

Here, generation of the order information refers to forming data for placing or contracting an order of a financial product by the financial product transaction management system 1A according to the first embodiment. As will be described later, in the first embodiment, an order is placed or contracted based on the order information.

[Step S1(1): Display of Order Input Screen]

Customers using the financial product transaction management system 1A accesses the financial product transaction management apparatus 1 using the client terminal 2. The front page distribution unit 11 of the financial product transaction management apparatus 1 displays the order input screen 100 shown in FIGS. 4A and 4B (and FIGS. 5A and 5B) on the display unit 22 of the client terminal 2 that has been accessed.

The order input screen 100 shown in FIGS. 4A and 4B displays a TORARIPI order selection button 101 for selecting a transaction by "trap repeat if-done" (here, including a transaction by "RAKUTRA" order), a normal order selection button 102 for selecting an order for a transaction other than "trap repeat if-done" (hereinafter referred to as a "normal order"), and a currency pair selection button 103 for selecting a set of currencies to be traded.

The order input screen 100 also displays a trading type selection button 104 for selecting either a buy order or a sell order as the first order (new order), a trap price range designation button 105 for setting a "trap price range" as a price range of the first orders or the second orders set to a plurality of order prices (designating an order as a "normal order"), a lower limit price input field 106a for setting a lower limit price of a "RAKUTRA" order, an upper limit price input field 106b for setting an upper limit price, and an order amount set button 107 for setting an "order amount (described later)".

Further, the order input screen 100 displays a trap number set button 108 for setting the "trap number" as the number of the plurality of first orders and the number of the plurality of second orders set to different order prices, and a trap price range display field 109 for displaying the "trap price range" set as the result of the calculation.

Figures 4A, 4B:
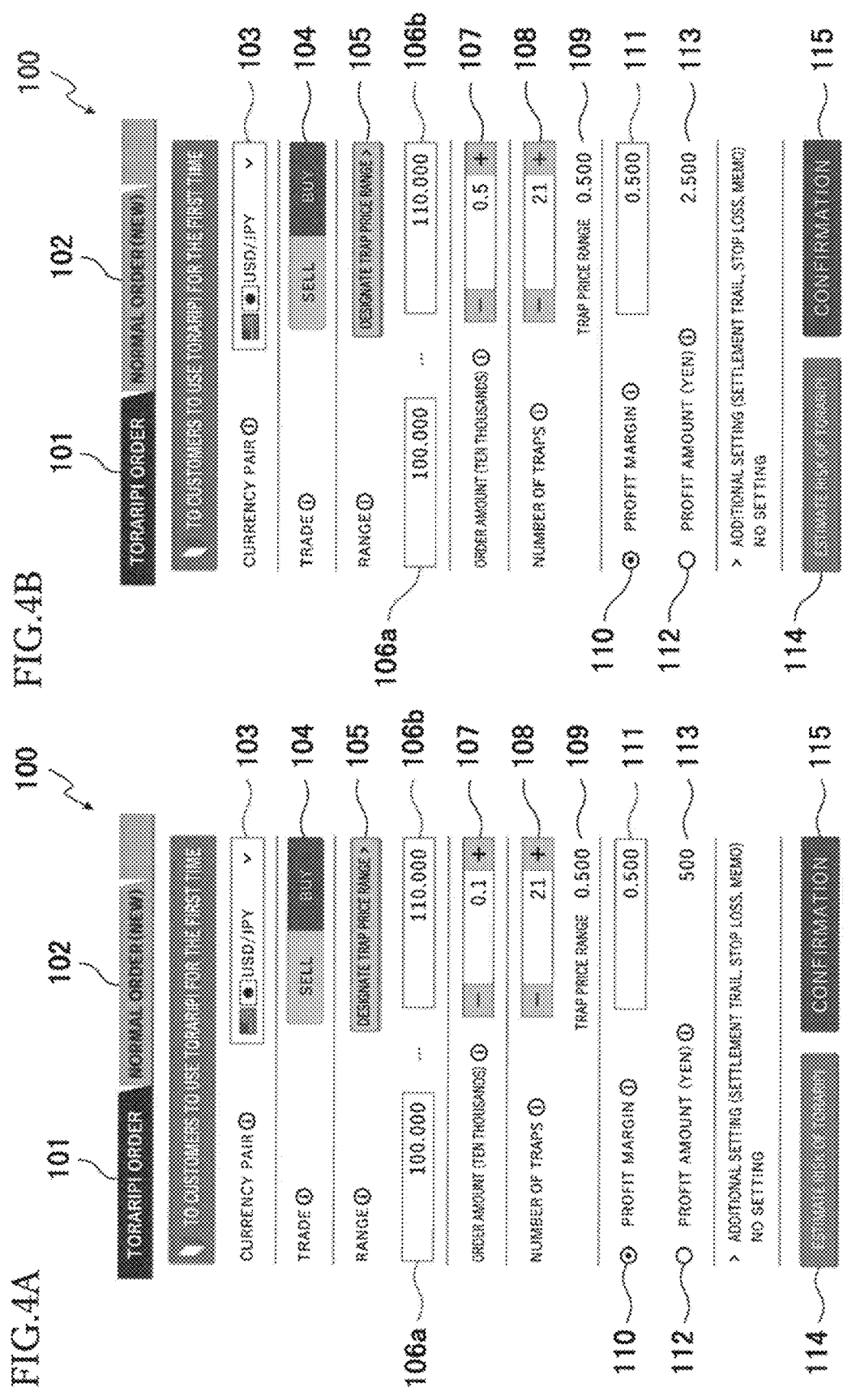

In FIG. 4A, the trap price range display field 109 shows a state in which 10.000/20=0.500 (yen) is displayed as the "trap price range". Here, this numerical value (0.500 (yen)) is obtained by dividing a numerical value (10.000 (yen)) in FIG. 4A) obtained by subtracting the numerical value of the lower limit price (100.000 (yen) in FIG. 4A) input in the lower limit price input field 106a from the numerical value of the upper limit price (110.000 (yen) in FIG. 4A) input in the upper limit price input field 106b for setting the upper limit price (this numerical value is an order price range (hereinafter simply referred to as an "order price range") as a price range in which the first order and the second order are set) by a numerical value (21−1=20 in FIG. 4A) obtained by subtracting 1 from the numerical value of the "trap number" input in the trap number set button 108. The "trap price range" displayed in the trap price range display field 109 is a result of calculation performed by the order information generation unit 16 when the numerical value of the upper limit price input in the upper limit price input field 106b, the numerical value of the lower limit price input in the lower limit price input field 106a, and the numerical value of the "trap number" input in the trap number set button 108 are sent to the order information generation unit 16.

Further, the order input screen 100 displays a profit margin input selection button 110 for selecting order setting by input of a "profit margin (described later)" and a profit margin input display field 111 for inputting and displaying the "profit margin (described later)". The value of the profit margin input in the profit margin input display field 111 is "profit margin setting information" for setting the profit margin. The value of the profit margin input in the profit margin input display field 111 is "profit margin changing information" for changing one profit margin already set to another profit margin.

Further, the order input screen 100 displays a profit amount input selection button 112 for selecting an order setting by input of a "profit amount (described later)", a profit amount input display field 113 for inputting and displaying the "profit amount (described later)". The value of the profit amount input in the profit amount input display field 113 is "profit amount setting information" for setting the profit amount. The value of the profit amount input in the profit amount input display field 113 is "profit amount changing information" for changing one profit amount already set to another profit amount. Further, the order input screen 100 displays a risk estimation execution button 114 for performing calculation of risk estimation when the transaction is to be conducted by "trap repeat if-done" according to the type of the order and numerical values input in the respective input fields 103 to 113, and a confirmation button 115 for displaying a final confirmation display screen (not shown) for conducting the transaction according to the type of the order and numerical values input in the respective input fields 103 to 113.

The user of the client terminal 2 performs inputting of numerical values and selection necessary for the order input screen 100, and confirms, on a confirmation screen (not shown), the contents of the order to be generated (step S1).

FIG. 4A shows a state in which the TORARIPI order selection button 101 is selected, a currency pair of US dollar/Japanese yen is selected in the currency pair selection button 103, a buy order is selected as the first order in the trading type selection button 104, 100.000 yen is input in the lower limit price input field 106a, 110.000 yen is input in the upper limit price input field 106b, 5000 yen is set in the order amount set button 107, 21 is set in the trap number set button 108, 0.500 is displayed in the trap price range display field 109, the profit margin input selection button 110 is selected, 0.500 is input in the profit margin input display field 111, the profit amount input selection button 112 is not selected, and 2500 yen is displayed in the profit amount input display field 113.

When the risk estimation execution button 114 is clicked in the state shown in FIG. 4A, information of the numerical values input in the respective input fields and the selected order modes input in the respective selection fields are sent to the order information generation unit 16, and the order information generation unit 16 performs a predetermined risk estimation based on these numerical values and the order modes. When the confirmation button 115 is clicked in this state, the confirmation screen (not shown) is displayed on the display unit 22. The confirmation screen (not shown) displays the whole or a part of the order information of each of the first order and the second order (e.g., the order price and the order amount of each order information) which is the result of calculation performed by the order information generation unit 16 based on the numerical values input in the respective input fields and the selected order modes input in the respective selection fields. Then, when the execution button (not shown) of the confirmation screen (not shown) is clicked, the order information generation unit 16 generates the order information displayed on the confirmation screen (not shown) after the processing in steps S2 to S10 described later is performed. Then, the financial product transaction management apparatus 1 starts the transaction of the first order and the second order based on the generated order information.

[Step S1(2): Order Amount, Profit amount, and Profit Margin]

The "order amount" in the first embodiment is an order amount per one first order or one second order.

The "profit amount" in the first embodiment is an amount of profit obtained each time one transaction of the first order (new order) and one transaction of the second order (settlement order) corresponding thereto are established.

Further, the "profit margin" in the first embodiment refers to a width of price increase or price decrease targeted in one second order with respect to one first order.

In the first embodiment, relationships shown in following Equation (1) and Equation (2) exist among the "order amount", the "profit amount", and the "profit margin".

$$\text{Profit amount} = \text{order amount} \times \text{profit margin (rounded to the nearest integer):} \quad \text{Equation (1)}$$

$$\text{Profit margin} = \text{profit amount} = \text{order amount (rounded to the nearest integer):} \quad \text{Equation (2)}$$

The order information generation unit 16 of the first embodiment generates order information for conducting a transaction of the first order and the second order by performing calculation based on Equation (1) and Equation (2).

A specific example of the above will be described. For example, in the chart schematically shown in FIG. 6A, it is assumed that the transaction is to be conducted by an if-done order of a first order and a second order with setting in which the first order is set to 1000 dollars of a buy order at 100.00 yen/dollar and the second order is set to a sell order of 1000 dollars at 101.00 yen/dollar. In this case, it is assumed that profit of 1000 yen is obtained by the contract of one second order with respect to the contract of one first order. The width of price increase of one second order with respect to one first order is 1 yen.

The "order amount" in this case is 1000 dollars. The "profit amount" is calculated by Equation (1) as "Profit amount=1000 (order amount)×1 (profit margin)=1000 (yen)". Further, the "profit margin" is calculated by Equation (2) as "Profit margin=1000 (profit amount)/1000 (order amount) =1 (yen)".

[Step S1(3): Input on Order Input Screen and Calculation of Order Information Generation Unit]

In the first embodiment, the front page distribution unit 11 transmits, to the client terminal 2, the order input screen 100 on which information that can be input is limited, based on the selection information input on the order input screen 100, and causes the order input screen 100 to be displayed on the display unit 22. Further, the order information generation unit 16 performs calculation in a state in which a predetermined numerical value is handled as a fixed value based on conditions such as limitation of information that can be input on the order input screen 100.

[Step S1(4): Calculation Mode 1]

For example, when the profit margin input selection button 110 is selected on the order input screen 100, the front page distribution unit 11 displays a screen, as shown in FIG. 4A, in which a numerical value of the profit margin can be input in the profit margin input display field 111 and a numerical value cannot be input in the profit amount input display field 113. In this state, a numerical value of the profit amount calculated as a result of the calculation is displayed in the profit amount input display field 113.

At this time, in the case in which the user of the client terminal 2 inputs the numerical value of the order amount in the order amount set button 107 or changes the numerical value of the order amount already input in the order amount set button 107, the numerical value of the profit margin is not automatically changed when the numerical value of the profit margin has already been input in the profit margin input display field 111, and on the other hand, the numerical value of the profit amount displayed in the profit amount input display field 113 is automatically changed by the calculation of the order information generation unit 16.

Specifically, in the first embodiment, the order information generation unit 16 of the financial product transaction management apparatus 1 calculates the profit amount, the order amount, and the profit margin by the calculation of following Equation (1).

$$\text{Profit amount} = \text{order amount} \times \text{profit margin (rounded to the nearest integer):} \quad \text{Equation (1)}$$

On the order input screen 100, when the order information generation unit 16 performs the calculation of Equation (1), the profit margin input in the profit margin input display field 111 is a fixed value, and the profit amount displayed in the profit amount input display field 113 is a variable value calculated by the calculation of Equation (1).

On the other hand, on the order input screen 100, when the user of the client terminal 2 does not change the numerical value of the order amount input in the order amount set button 107 and changes the numerical value of the profit margin input in the profit margin input display field 111, the order information generation unit 16 performs the calculation of Equation (1) again based on the changed profit margin, and as a result of the calculation, the value of the profit amount calculated by the calculation of Equation (1) is displayed in the profit amount input display field 113.

In this manner, in the first embodiment, the user of the client terminal 2 inputs the numerical value of the order amount or the numerical value of the profit margin on the order input screen 100, thereby calculating the profit amount by calculation. In this case, the display unit 22 of the client terminal 2 has a configuration with which the profit margin is input and displayed in the profit margin input display field 111, and the calculation of Equation (1) is performed without changing the numerical value of the profit margin input in the profit margin input display field 111 unless the user changes the numerical value, thereby the user can calculate the profit amount by the transaction of the first order and the second order in a state in which the user is aware of the numerical value of the profit margin. In addition, the user can set the order prices of the first order and the second order for obtaining the profit margin and the profit amount desired by the user while repeatedly changing the numerical value of the profit margin input in the profit margin input display field 111 and causing the order information generation unit 16 to perform the calculation, and can conduct the transaction of the first order and the second order.

[Step S1(5): Calculation Mode 2]

Further, for example, as shown in FIG. 5A, when the profit amount input selection button 112 is selected on the order input screen 100, the front page distribution unit 11 displays a screen in which a numerical value of the profit amount can be input in the profit amount input display field 113 while a numerical value cannot be input in the profit margin input display field 111. In this state, a numerical value of the profit margin calculated as a result of the calculation is displayed in the profit margin input display field 111.

At this time, when the user of the client terminal 2 inputs the numerical value of the order amount in the order amount set button 107 or changes the numerical value of the order amount already input in the order amount set button 107, the numerical value of the profit amount is not automatically changed when the numerical value of the profit amount has already been input in the profit amount input display field 113, and on the other hand, the numerical value of the profit margin displayed in the profit margin input display field 111 is automatically changed by the calculation of the order information generation unit 16.

In this case, the order information generation unit 16 of the financial product transaction management apparatus 1 calculates the profit amount, the order amount, and the profit margin by the calculation of Equation (2).

Profit margin=profit amount=order amount(rounded to the nearest integer): Equation (2)

On the order input screen 100, when the order information generation unit 16 performs the calculation of Equation (2), the profit amount input in the profit amount input display field 113 is a fixed value, and the profit margin displayed in the profit margin input display field 111 is a variable value calculated by the calculation of Equation (2).

On the other hand, on the order input screen 100, when the user of the client terminal 2 does not change the numerical value of the order amount input in the order amount set button 107 and changes the numerical value of the profit amount input in the profit amount input display field 113, the order information generation unit 16 performs the calculation of Equation (2) again based on the changed profit amount, and as a result of the calculation, the value of the profit margin calculated by the calculation of Equation (2) is displayed in the profit margin input display field 111.

In this manner, in the first embodiment, the user of the client terminal 2 inputs the numerical value of the order amount or the numerical value of the profit amount on the order input screen 100, thereby calculating the profit margin by calculation. In this case, the display unit 22 of the client terminal 2 has a configuration with which the profit amount is input and displayed in the profit amount input display field 113, and the calculation of Equation (2) is performed without changing the numerical value of the profit amount input in the profit amount input display field 113 unless the user changes the numerical value, thereby the user can calculate the profit margin by the transaction of the first order and the second order in a state in which the user is aware of the numerical value of the profit amount. In addition, the user can set the order prices of the first order and the second order for obtaining the profit margin and the profit amount desired by the user while repeatedly changing the numerical value of the profit amount input in the profit amount input display field 113 and causing the order information generation unit 16 to perform the calculation, and can conduct the transaction of the first order and the second order.

[Step S1(6): Effect of Configuration of Order Input Screen]

In the first embodiment, the order input screen 100 has a screen configuration in which [calculation mode 1] and [calculation mode 2] can be selected, and thus it is possible to provide the setting of the first order and the second order with a plurality of variations. As a result, it is possible to provide a plurality of transaction modes which are desired by the user and which can be easily conducted by the user who believes that there is a high possibility of earning profit, and to improve the convenience for the user.

Further, in the first embodiment, as shown in FIG. 4A, the profit margin input in the profit margin input display field 111 is set as a fixed value, the profit amount displayed in the profit amount input display field 113 is displayed as a variable value, and the order information generation unit 16 performs the calculation shown in Equation (1) and Equation (2), thereby causing the user to input the profit margin and enabling setting of the order amount and the like of the first order and the second order by calculation with the input profit margin displayed. Accordingly, it is possible to cause the user being aware of the profit margin to set the first order and the second order and to easily perform setting of the order in the transaction mode which are desired by the user and which can be easily conducted by the user who believes that there is a high possibility of earning profit.

Further, in the first embodiment, when the user does not change the numerical value of the order amount set by the order amount set button 107 and changes the numerical value of the profit margin input in the profit margin input display field 111, the order information generation unit 16 performs the calculation of Equation (1) and Equation (2) again based on the changed profit margin, and as a result of the calculation, the value of the profit amount calculated by the calculation of Equation (1) and Equation (2) is displayed in the profit amount input display field 113. Accordingly, since the user can set the first order and the second order by trial and error of changing the value of the profit margin input in the profit margin input display field 111, it is possible to provide the financial product transaction management system 1A with high convenience for the user such that the user can easily obtain the desired setting of the first order and second order by setting the first order and second order based on the profit margin.

On the order input screen 100 shown in FIG. 4A or 4B (or the order input screen 100 shown in FIG. 5A or 5B) of the first embodiment, the order information generation unit 16 performs calculation as shown in calculation mode 1, and the calculation result is shown on the order input screen 100. According to the values of the order amount and the profit margin input on the screen, it becomes easier for a user to sensuously perceive how much profit can be obtained by one trading even between currencies which are not familiar to the user and convenience for the user can be improved, in particular, when it is difficult for the user to sensuously perceive how much profit can be obtained by one trading of a financial product, such as when a user is a Japanese person and transaction currencies are non-Japanese currencies (e.g., Australia dollar and New Zealand dollar).

[Step S1(7): Relationship Between Default Values of Trap Price Range and Profit Margin]

In the first embodiment, the order information generation unit 16 is configured to perform calculation as default values of the trap price range and the profit margin are the same.

Specifically, for example, on the order input screen 100 shown in FIG. 4A, the order information generation unit 16 calculates the trap price range based on the input of numerical values in the lower limit price input field 106*a*, the upper limit price input field 106*b*, and the trap number set button 108, and at this time, the order information generation unit 16 performs calculation as the default values of the trap price range and the profit margin are the same. FIG. 4A shows a state in which the order information generation unit 16 causes 500 (yen), which is the same value (0.500 (thousand yen) in FIG. 4A) as the value of the trap price range displayed in the trap price range display field 109, to be displayed in the profit margin input display field 111 as the default profit margin.

When the user of the client terminal 2 wants to change the default profit margin, the user changes the numerical value of the default profit margin displayed in the profit margin input display field 111 on the order input screen 100 to the numerical value of a desired profit margin. When the user clicks the confirmation button 115 on the order input screen 100 in this state, the order information generation unit 16 performs calculation by Equation (1) using the numerical value of the profit margin newly input in the profit margin input display field 111, and calculates the profit amount. Then, the profit amount newly calculated by Equation (1) is displayed in the profit amount input display field 113 of the order input screen 100.

As described above, in the first embodiment, calculation is performed as the default values of the trap price range and the profit margin are the same, so that the user can easily perceive the values of the trap price range and the profit margin without confusion. Further, in the first embodiment, since the numerical value of the default profit margin displayed in the profit margin input display field 111 can be changed to the numerical value of the desired profit margin with operation of the client terminal 2 by the user, the user can set the first order and the second order with the desired profit margin or profit amount while freely changing the profit margin, and can conduct the transaction.

[Step S1(8) Specific Example of Change in Profit Margin and Change in Profit Amount]

FIGS. 6A, 6B, 7A, and 7B schematically show charts when the profit margin is changed. FIGS. 6A and 6B are charts schematically showing cases in which the order information generation unit 16 generates order information and conducts a transaction in the state of the order input screen 100 in FIGS. 4A and 4B.

FIG. 6A schematically shows a chart in a case in which a transaction of the first order and the second order is conducted based on the order information generated in a state in which numerical value input and selection are performed on the order input screen 100 as shown in FIG. 4A.

FIG. 6B schematically shows a chart in a case in which a transaction of the first order and the second order is conducted based on the order information generated in the state in which numerical input and selection are performed on the order input screen 100 as shown in FIG. 4B.

When the order amount is changed by the order amount set button 107 on the order input screen 100 as from FIG. 4A to FIG. 4B, the order to be set changes from the state shown in FIG. 6A to the state shown in FIG. 6B. That is, each order is set in a state in which the profit margin is constant and the profit amount is changed.

On the other hand, FIGS. 7A and 7B are charts schematically showing cases in which the order information generation unit 16 generates order information and conducts a transaction in the state of the order input screen 100 in FIGS. 5A and 5B.

FIG. 7A schematically shows a chart in a case in which a transaction of the first order and the second order is conducted based on the order information generated in the state in which numerical value input and selection are performed on the order input screen 100 as shown in FIG. 5A.

FIG. 7B schematically shows a chart in a case in which a transaction of the first order and the second order is conducted based on the order information generated with the order input screen 100 in the state in which numerical value input and selection are performed as shown in FIG. 5B.

When the profit amount is changed by the profit amount input display field 113 on the order input screen 100 as from FIG. 5A to FIG. 5B, the order to be set changes from the state shown in FIG. 7A to the state shown in FIG. 7B. That is, each order is set in a state in which the profit amount is constant and the profit margin is changed.

Thus, by changing the setting of the order input screen 100 and the numerical values and the like to be input, the user of the financial product transaction management system 1A can easily set desired order information in various ways.

[Procedure of Steps S2 to S10]

When the user of the client terminal 2 clicks the confirmation button 115 in the state shown in FIG. 4A, 4B, 5A, or 5B, the data input and selected on the order input screen 100 is supplied to the financial product transaction management apparatus 1. The order input reception unit 12 of the financial product transaction management apparatus 1 confirms contents of the input order. Further, the order input reception unit 12 checks each order price (step S2).

Specifically, for example, the order input reception unit 12 confirms, based on predetermined calculation, whether or not profit is obtained by conducting a transaction based on the order price range between the lower limit price input field 106a and the upper limit price input field 106b and the price of the numerical value input or displayed in the profit margin input display field 111 with respect to the selected financial product. Further, for example, the order input reception unit 12 may be configured to compare the current market price of the selected financial product with the reference price of the order input from the order input screen 100, and confirm whether or not the reference price is lower (or higher) than the current market price at the time when the confirmation button 115 or the order button (not shown) is clicked. Further, for example, when the first order is a buy order, the order input reception unit 12 may be configured to confirm whether or not the desired contract price of the first order is lower than the current market price at the time when the confirmation button 115 or the order button (not shown) is clicked, or to confirm whether or not the desired contract price of the second order is higher than the desired contract price of the first order.

As a result of the confirmation in step S2, when the input price is appropriate (e.g., in a case in which setting is satisfied when the order input reception unit 12 is set to determine as being appropriate only when profit is to be obtained by conducting a transaction based on the input price), the order input reception unit 12 determines that the input price is an appropriate price.

When the price of the buy order is determined to be appropriate (NO in step S3), the account information generation unit 15 obtains fund information of the customer in the customer account information table 182.

The order input reception unit 12 compares the obtained fund information with the total order amount of the customer, and checks whether or not the amount of funds is equal to or more than an order allowable amount.

Here, the "order allowable amount" is an amount required for an order (the same applies in the present specification).

The order information generation unit 16 generates "order information" described later and an "order information group" described later including "order information" only when the amount of funds is equal to or more than the order allowable amount (NO in step S5). Thus, the order can be accepted only when the customer can surely make payment.

When the amount of funds is equal to or more than the order allowable amount (NO in step S5), the order input reception unit 12 checks whether or not the order conditions satisfy various requirements of the order other than those described above, based on the data recorded in the currency pair order condition table 183 and the like (step S6).

When any of the various requirements of the order is not satisfied (YES in step S7), the order input reception unit 12 treats the input order as an error and rejects acceptance of the order (step S10).

When the various requirements of the order are satisfied (NO in step S7) and the order conditions are determined to satisfy all the requirements necessary for the order, the front page distribution unit 11 displays a confirmation screen (not shown) on the display unit 22 of the client terminal 2 in a pop-up manner. On the confirmation screen (not shown), the contents of the order generated based on the input numerical value, the selected condition, and the like on the order input screen 100 are displayed.

When the user clicks the order button (not shown) on the confirmation screen (not shown) in this state, the order information generation unit 16 generates the order information based on the information input on the order input screen 100 in step S1 and transmitted from the client terminal 2 to the financial product transaction management apparatus 1 (step S8).

Specifically, a plurality of pieces of data input in the above-described procedure are collected in units of order prices, and a sequence number is assigned to each order recorded in the sequence number table 184 for each information, thereby forming each piece of order information. At this time, information for distinguishing the sequence number used in the order information from an unused number is added to the sequence number table 184. A plurality of pieces of order information generated in one procedure of step S8 form an order information group including order information for ordering a financial product at a first order price (described later) and order information for ordering a financial product of the same type at a second order price (described later) (hereinafter simply referred to as an "order information group"). The generated order information and the orders based on the order information are displayed on the display unit 22 of the client terminal 2 by the processing of the order information generation unit 16.

The order information generation unit 16 records information of the generated order information group in the order table 181 (step S9). The order information is recorded in the order table 181 based on the definition of each field shown in FIG. 2.

For example, an "ord_seq" field 181b in the order table 181 defines a sequence number assigned in step S8 (same as the order number 181A shown in FIG. 8). A "cust_seq" field 181c defines a customer number uniquely determined for each customer, and a "style_id" field 181d defines a product name. A "com_id" field 181e defines an ID number uniquely determined for each financial product. A combination of the ID number and the financial product is recorded in an ID table (not shown) separately provided in the database. An "ord_amnt" field 181f defines the order quantity input in an order quantity input field 56 (or a quantity such as a stock price index defined based on the order quantity). A "buy_sell_id" field 181g defines whether the order is a sell order or a buy order selected in an order type input field 54, an "ord_rate" field 181h defines an order price, and a "limit_time" field 181i defines an order time limit. An "ord_cond" field 181j defines the order type selected in a buy-sell selection field 53. A "trail_range" field 181k defines a trail width (see a second embodiment of the present invention), a "through_range" field 181m defines a through price range (see the second embodiment of the present invention), and a "new_close" field 181n defines whether the order is a new order or a settlement order. Although not shown in FIG. 2, the order table 181 is also provided with fields for defining other data input on the order input screen 100. With these fields, all data input on the order input screen 100 is recorded in the order table 181. Through the above procedure, the order reception processing in the first embodiment is completed.

When at least one of the price of the buy order and the price of the sell order is determined to be an inappropriate price in step S3 (YES in step S3) or when the amount of funds is less than the total order amount in step S5 (YES in step S5), the order input reception unit 12 treats the input order as an error and rejects acceptance of the order (step S10). In this case, the order information (described later) is not generated, and text information or the like indicating that acceptance of the order has been rejected is displayed on the display unit 22 of the client terminal 2.

The timing at which the information input on the order input screen 100 is transmitted to the financial product transaction management apparatus 1 may be when the confirmation button 115 is clicked or may be when the order button (not shown) on the confirmation screen (not shown) is clicked. The information transmitted to the order information generation unit 16 may be any information other than the information input in each of the input/selection fields 103 to 113 as long as the information is capable of generating first order information and second order information (described later) by various calculations. Specifically, for example, the information may include a period during which an order is to be placed, an amount of profit to be obtained within the period, an amount of funds to be used for a transaction, and the like.

The generation of the order information shown in step S8 may be performed as all the order information (or the order information group) is generated at once when the confirmation button 115 or the order button (not shown) on the confirmation screen (not shown) is clicked, may be performed when the first order or the second order is placed, may be performed every time the first order or the second order is repeatedly placed, may be performed at a timing when a first order price (described later) or a second order price (described later) is changed, or may be performed at any other timing.

The order of steps S1 to S10 is not limited to that shown in FIG. 3, and may be any order. Further, the timing at which the confirmation button 115 or the order button (not shown) on the confirmation screen (not shown) is clicked and the timing at which the processing in steps S1 to S10 is performed may be any timings. For example, the order information generation unit 16 may perform the processing in steps S1 to S10 after the confirmation button 115 or the order button (not shown) on the confirmation screen (not shown) is clicked.

Further, at least a part of the processing in steps S1 to S10 may be performed in the client terminal 2. For example, in step S9, the order information generation unit 16 may transmit the generated order information to the client terminal 2, and the client terminal 2 may record the order information in an order table (not shown) generated in the client terminal 2.

[Configuration of Order Information and Order Information Group]

FIG. 8 is a diagram schematically showing a transaction display screen after order information is generated, which is displayed on the display unit 22 of the client terminal 2 in the first embodiment. In the transaction display screen 24, the order information (first order information and second order information) and the order information group generated by the order information generation unit 16 are shown in a state in which the input of the numerical values and the selection of the condition are performed in the manner of the order input screen 100 shown in FIG. 4B. The order information is generated by the procedure of steps S1 to S10 described above.

An order information group 18110 according to the first embodiment shown in FIG. 8 includes 21 pieces of first order information 18111, 18112, . . . , 18120, 18121 each forming a first order (a new order, i.e., an order to hold a position by being contracted) and 21 pieces of second order information 18122, 18123, . . . , 18141, 18142 each forming a second order (a settlement order, i.e., an order to be placed when the corresponding first order is contracted and to settle the position held by the contract of the corresponding first order by being contracted). The order information group 18110 may further include other order information (e.g., stop limit order information constituting a stop loss order). The order information generation unit 16 calculates the number of traps as 21 with inputting of numerical values on the order input screen 100, so that the order information group 18110 shown in FIG. 8 includes 21 pieces of generated first order information 18111, 18112, . . . , 18120, 18121 and 21 pieces of generated second order information 18122, 18123, . . . , 18141, 18142. Depending on the number of traps calculated by the order information generation unit 16, the number of pieces of first order information and the number of pieces of second order information may be any numbers other than those described above.

As shown in FIG. 8, the first order information 18111, 18112, . . . , 18120, 18121 and the second order information 18122, 18123, . . . , 18141, 18142 include, as attribute information, an order number 181A functioning as an ID, a customer number 181B functioning as a number for identifying a customer (i.e., a user of the financial product transaction management system 1A), currency pair information 181C indicating a type of a financial product (here, a type of a currency to be traded), order amount information 181D indicating an order amount of each order, and order date and time information 181E indicating date and time when the order information has been generated.

Further, the first order information 18111, 18112, . . . , 18120, 18121 and the second order information 18122, 18123, . . . , 18141, 18142 include, as attribute information, buy-sell information 181F indicating whether each order is a buy order or a sell order, order price information 181G as a desired settlement price of each order (which is a price that a customer wants to contract and that corresponds to a contract price of a limit order or a trigger price of an order by a "trigger market order"), and order time limit information 181H indicating time limit of each order.

Further, the first order information 18111, 18112, . . . , 18120, 18121 and the second order information 18122, 18123, . . . , 18141, 18142 include, as attribute information, order type information 181J indicating an order type (in FIG. 8, the order type called "TORARIPI" indicating "trap repeat if-done" in which a plurality of first orders and a plurality of second orders are placed respectively at a plurality of prices and the respective first orders and the respective second orders are repeated is shown), profit margin information 181K indicating a numerical value of a profit margin, and profit amount information 181L indicating a numerical value of a profit amount.

Further, the first order information 18111, 18112, . . . , 18120, 18121 and the second order information 18122, 18123, . . . , 18141, 18142 include, as attribute information, new/settlement information 181M indicating whether each order is "new" indicating a new order of an if-done order or "settlement" indicating a settlement order, and execution condition information 181N indicating whether each order is "limit order", "market order", "stop limit order", "stop loss order", or the like.

Further, the first order information 18111, 18112, . . . , 18120, 18121 and the second order information 18122, 18123, . . . , 18141, 18142 include, as attribute information, order status information 181P indicating any status of each order among "ordered" (an ordered status before being contracted), "waiting" (an unordered status), and "contracted" (a contracted status) (while some of these three statuses may not be shown, or a status other than these three statuses may be shown), settlement trail information 181Q for specifying whether or not the order information conducts an order with a "settlement trail order (described in the second embodiment)" specified, and stop loss information 181R for specifying whether or not the order information conducts a stop loss order.

Here, the first order information 18111, 18112, . . . , 18120, 18121 and the second order information 18122, 18123, . . . , 18141, 18142 may include attribute information required for conducting a transaction other than the above information 181A to 181R (e.g., information for identifying a first order and a second order associated for conducting an if-done order). Further, the first order information 18111, 18112, . . . , 18120, 18121 and the second order information 18122, 18123, . . . , 18141, 18142 may not include at least one piece of unnecessary attribute information of the above information 181A to 181R when the transaction with the first order and the second order can be appropriately conducted by another configuration.

Here, according to specific first order information (e.g., the first order information 18111) and corresponding specific second order information (e.g., the second order information 18122) included in one order information group 18100, one time of the first order is placed and contracted and one time of the second order is placed and contracted. Specifically, one first order (new order) is placed and contracted according to specific first order information (e.g., the first order information 18111) to hold a position of the financial product, one second order (settlement order) is placed according to specific second order information (e.g., the second order information 18222) based on the contract of the first order, and the held position is settled according to the contract of the second order (settlement order). Therefore, when the first order and the second order are repeated, a plurality of order information groups 18100, 18100, 18100, . . . are required.

In the first embodiment, in the case in which the first order and the second order are repeated according to the order information group 18100, a new order information group 18100 is generated at the time of the repetition (e.g., at the time when the second order is contracted based on the second order information 18122). Here, a plurality of the order information groups 18100, 18100, 18100, . . . for repeating the first order and the second order may be collectively generated at the time when the confirmation button 115 or the order button (not shown) is clicked.

Note that the display unit 22 of the client terminal 2 used by the customer may display, by the processing of the order information generation unit 16 and the contract information generation unit 14, a chart of transactions conducted based on the first order information 18111, 18112, . . . , 18120, 18121 and the second order information 18122, 18123, . . . , 18141, 18142 as shown in FIG. 9 together with the table of the order information group 18100 as shown in FIG. 8 so that the customer can easily perceive the generated order information, placement and contract of the order, the transaction status based on the order, and the like.

[Processing Procedure After Order Information Generation]

FIG. 9 is a chart schematically showing the order information generated based on the processing in the financial product transaction management system 1A of the first embodiment and the transaction mode associated with market price fluctuation.

In the following description, generation and the like of order information related to order placement and the like are basically performed by processing of the order information generation unit 16, but may be performed by the contract information generation unit 14. Further, rewriting, deleting, and the like of order information relating to an order contract and the like are basically performed by processing of the contract information generation unit 14, but may be performed by the order information generation unit 16. Further, depending on the state of the system configuration or the data configuration, each processing may be performed by a unit other than the above-described functional units. Further, it is also possible that processing is performed in such a manner that the processing is performed in cooperation of a plurality of functional units, for example, the order information generation unit 16 and the contract information generation unit 14.

When one order information group 18100 is generated, the order status information 181P of the first order information 18111, 18112, . . . , 18120, 18121 becomes "ordered" indicating the status of "ordered and uncontracted". At this time, the order status information 181P of the second order information 18122, 18123, . . . , 18141, 18142 is "unordered" indicating the status of "unordered and uncontacted".

Then, based on the first order information 18111, 18112, . . . , 18120, 18121, the first orders $8111_1$, $8112_1$, . . . , $8120_1$, $8121_1$ are in the status of ordered and uncontracted, and the transaction is started.

For example, as shown in FIG. 9, it is assumed that a market price 30 at the start of the transaction is 111.00 yen/dollar, and the market price 30 falls to 110.00 yen/dollar. At this time, the price information reception management unit 19 obtains information that the market price 30 is 110.00 yen/dollar. When the information of the market price 30 is obtained, the contract information generation unit 14 changes the order status information 181P of the first order information 18111 from "ordered" to "contracted", and performs processing so that the first order $8111_1$ has been contracted and a position is held. Then, the order information generation unit 16 changes the order status information 181P of the second order information 18122 from "unordered" to "ordered" to make the second order $8122_1$ corresponding to the first order $8111_1$ placed.

Then, as shown in FIG. 9, it is assumed that the market price 30 changes from falling to rising to 110.50 yen/dollar. When the price information reception management unit 19 receives the change of the market price 30, the contract information generation unit 14 changes the order status information 181P of the second order information 18122 from "ordered" to "contracted" to make the second order $8122_1$ contracted and the held position is settled. The above processing completes the trade transaction of the if-done order in which the first order $8111_1$ is a new order and the second order $8122_1$ is a settlement order.

Then, when the order status information 181P of the second order information 18122 is changed from "ordered" to "contracted", the order information generation unit 16 generates a new order information group 18100, and changes the order status information 181P of the first order information 18111 from "unordered" to "ordered" to make a new first order $8111_2$ placed.

Thereafter, as shown in FIG. 9, when the market price 30 falls again to 110.00 yen/dollar, the contract information generation unit 14 changes the order status information 181P of the first order information 18111 from "ordered" to "contracted" to make the first order $8111_2$ contracted, and the order information generation unit 16 changes the order status information 181P of the second order information 18122 from "unordered" to "ordered" to make the second order $8122_2$ corresponding to the first order $8111_2$ placed.

Then, when the market price 30 changes from falling to rising again and reaches 110.50 yen/dollar, the contract information generation unit 14 changes the order status information 181P of the second order information 18122 from "ordered" to "contracted" to make the second order $8122_2$ contracted. The above processing completes the trade transaction of the if-done order in which the first order $8111_2$ is a new order and the second order $8122_2$ is a settlement order. Thereafter, the order information generation unit 16 generates a new order information group 18100 again, and sets the order status information 181P of the first order information 18111 to "ordered" to make the first order $8111_3$ placed, and thereafter, similar if-done orders based on the first order information 18111 and the second order information 18122 are repeated.

Although not shown in FIG. 9, when the market price further falls from 110.00 yen/dollar serially to 109.00 yen/dollar, 108.00 yen/dollar, . . . , 100.00 yen/dollar, the contract information generation unit 14 serially changes the order status information 181P of the first order information 18112, 18113, . . . , 18121 from "ordered" to "contracted" to make the first orders $8111_2$, $8112_1$, . . . , $8121_1$ contracted, and the order information generation unit 16 serially changes the order status information 181P of the second order information 18122, 18123, . . . , 18142 from "unordered" to "ordered". Accordingly, the first orders $8112_1$, $8113_1$, . . . , $8121_1$ are serially contracted and positions are held, and the second order $8123_1$ corresponding to the first order $8112_1$, the second order $8124_1$ corresponding to the first order $8113_1$, . . . , and the second order $8142_1$ corresponding to the first order $8121_1$ are serially placed.

Then, although not shown in FIG. 9, when the market price 30 serially rises and reaches 100.50 yen/dollar, 101.50 yen/dollar, . . . , 109.50 yen/dollar, the contract information generation unit 14 serially changes the order status information 181P of the second order information 18142, 18141, . . . , 18122 from "ordered" to "contracted" to serially make the second orders $8142_1$, $8141_1$, . . . , $8122_1$ contracted and the held positions settled.

Thereafter, based on the first order information 18121, 18120, . . . , 18112, the first orders $8121_2$, $8120_2$, . . . , $8112_2$ are in a status of ordered and uncontracted, and thereafter, similar if-done orders based on the first order information 18112, 18113, . . . , 18121 and the second order information 18123, 18124, . . . , 18142 are repeated.

In the first embodiment, the order price information 181G of the first order information 18111, 18112, . . . , 18120, 18121 and the order price information 181G of the second order information 18122, 18123, . . . , 18141, 18142 of all the order information groups 18100, 18100, 18100, . . . shown in FIG. 8 are the same, and the first orders (e.g., the first orders $8111_1$, $8111_2$, $8111_3$, . . . ) and the second orders (e.g., the second orders $8122_1$, $8122_2$, $8122_3$, . . . ) shown in FIG. 9 are repeatedly placed and contracted at the same order price. However, it is also possible to have a configuration in which the order price information 181G of the first order information 18111, 18112, . . . , 18120, 18121 and the order price information 181G of the second order information $18122, 18123, \ldots, 18141, 18142$ of the respective order information groups $18100, 18100, 18100, \ldots$ are different, and accordingly, the order price of the respective first orders (e.g., the first orders $8111_1, 8111_2, 8111_3, \ldots$, shown in FIG. 8) and the order price of the respective second orders (e.g., the second orders $8122_1, 8122_2, 8122_3, \ldots$, shown in FIG. 8) are serially changed. For example, the order price of the first orders (e.g., the first orders $8111_1, 8111_2, 8111_3, \ldots$) appearing in repeated transactions may serially change by 0.01 yen as 110.00 yen/dollar, 110.01 yen/dollar, 110.02 yen/dollar, . . . , and the order price of the second orders (e.g., the second orders $8122_1, 8122_2, 8122_3, \ldots$) appearing in repeated transactions may serially change by 0.01 yen as 110.05 yen/dollar, 110.06 yen/dollar, 110.07 yen/dollar, . . . .

Further, in the first embodiment, the execution condition information 181N of the first order information 18111, 18112, . . . , 18120, 18121 and the execution condition information 181N of the second order information 18122, 18123, . . . , 18141, 18142 included in the respective order information groups 18100, 18100, 18100 shown in FIG. 8 are all limit orders, and the respective first orders (e.g., the first orders $8111_1, 8111_2, 8111_3, \ldots$) and the respective second orders (e.g., the second orders $8122_1, 8122_2, 8122_3, \ldots$) are repeatedly placed and contracted as limit orders. However, the execution condition information 181N of the order information may be all "market order" or "stop limit order" or may be mixture of "market order", "limit order" and "stop limit order".

Specifically, for example, in the state shown in FIG. 9, when the market price 30 at the start of the transaction is a price between the lower limit price input in the lower limit price input field 106a for setting the lower limit price and the upper limit price input in the upper limit price input field 106b for setting the upper limit price on the order input screen 100 and between values in the order price information 181G of the first order information 18111, 18112, . . . , 18120, 18121 and the second order information 18122, 18123, . . . , 18141, 18142 generated by the order information generation unit 16 (e.g., when the market price 30 at the start of the transaction is 101.22 yen/dollar in the state shown in FIG. 9), the order information generation unit 16 may generate, in the firstly-generated order information group 18100 shown in FIG. 8, the first order information 18111, 18112, . . . , 18119 each having the order price information 181G on the higher price side than the market price 30 at the start of the transaction such that the execution condition information 181N thereof is set to the "limit order", and the first order information 18120, 18121 each having the order price information 181G on the lower price side than the market price 30 at the start of the transaction such that the execution condition information 181N thereof is set to the "stop limit order", thereby the transaction is conducted such that, among the firstly-placed first orders $8111_1, 8111_2, 8111_3, \ldots$, orders on the higher price side than the market price 30 at the start of the transaction are handled as limit orders and orders on the lower price side are handled as stop limit orders.

Further, for example, the transaction may be conducted such that the "market order" is set in the execution condition information 181N of only specific order information, for example, the highest first order information 18111, and the "limit order" is set in the execution condition information 181N of other first order information 18111, 18112, . . . , 18120, 18121 and the second order information 18122, 18123, . . . , 18141, 18142 included in the firstly-generated order information group 18100 shown in FIG. 8, thereby only the first order $8111_1$ firstly-traded after the start of the transaction is traded based on the "trigger market" and other orders are traded as limit orders.

Further, "limit order", "market order", and "stop limit order" in the execution condition information 181N may be mixed in any manner other than the above.

The order information generation unit 16 and the contract information generation unit 14 cause the display unit 22 of the client terminal 2 used by the customer to display the generation of order information, the placement and contract of orders, the repetition of orders, and the like in this processing procedure, record the generation of such order information in the order table 181, and manage the placement and contract of orders, the repetition of orders, and the like by correcting, deleting, or adding the order information recorded in the order table 181.

[Shift Function]

FIG. 10 is a chart schematically showing a transaction conducted by a "shift function" as a modification of the "trap repeat if-done" realized in "RAKUTRA" of the first embodiment.

The "shift function" shown in FIG. 10 is a function configured such that the shift procedure 1 and shift procedure 2 described below are performed when any of the second orders $8122_1, 8122_2, 8122_3$ for example, the second order $8122_2$ is contracted.

(Shift Procedure 1)

As shown in FIG. 10, a new first order $8151_1$ is newly set on the higher price side than the first order on the highest price side, for example, the first order $8111_3$, and a new second order $8152_1$ is newly set on the higher price side than the second order on the highest price side, for example, the second order $8122_3$. Although not shown, at this time, also in the order information group 18100 shown in FIG. 8, new first order information corresponding to the newly-set first order $8151_1$ is generated, and new second order information corresponding to the newly-set second order $8152_1$ is generated.

In FIG. 10, both the newly-set first order $8151_1$ and the newly-set second order $8152_1$ have the same order amount, profit amount, and profit margin as those of another first order and another second order (e.g., the first order $8121_3$ and the second order $8142_3$ (see FIG. 9) to be deleted in the following (shift procedure 2)). That is, in FIG. 10, the newly-set first order $8151_1$ and the newly-set second order $8152_1$ are set such that the order amount is to be 5000, the profit margin is to be 0.500, and the profit amount is to be 2500.

However, the order amount, profit amount, and profit margin of the newly-set first order, for example, the first order $8151_1$ and the newly-set second order, for example, the second order $8152_1$ may not be the same as those of the other first order and second order, and may be set to any order amount, any profit amount, and any profit margin.

(Shift Procedure 2)

As shown in FIG. 10, the first order scheduled to be placed on the lowest price side, for example, the first order $8121_3$ (see FIG. 9), and the second order scheduled to be placed on the lowest price side, for example, the second order $8142_3$ (see FIG. 9) are deleted. At this time, also in the order information group 18100 shown in FIG. 8, the first order information 18121 corresponding to the deleted first order $8121_3$ and the second order information 18142 corresponding to the deleted second order $8142_3$ are not generated.

By shift procedure 1 and shift procedure 2 described above, the price range (110.50 to 100.50 yen/dollar) of the order prices formed by the first orders $8151_1$, $8111_3$, $8112_3$, ..., $8120_3$ and the price range (111.00 to 101.00 yen/dollar) of the order prices formed by the second orders $8152_1$, $8122_3$, $8123_3$, ..., $8141_3$ are shifted by 0.50 yen to the higher price side of the changed market price than the original price ranges of the first orders and the second orders.

In shift procedure 1 and shift procedure 2, the first order and the second order are respectively shifted to the higher price side, but only one of the first order and the second order may be shifted. In addition, the execution condition of the order information may be changed when the shift is performed. For example, when the deleted first order $8121_3$ or the deleted second order $8142_3$ is a limit order, the newly-set first order $8151_1$ or the newly-set second order $8152_1$ may be set as an order of "trigger market"). Further, first and second orders at a plurality of order prices (e.g., two first orders being the first order $8151_1$ shown in FIG. 10 and the first order at 111.00 yen/dollar (not shown) on the higher price side by 0.50 yen and two second orders being the second order $8152_1$ shown in FIG. 10 and the second order at 111.50 yen/dollar (not shown) on the higher price side by 0.50 yen) may be set in shift procedure 1, or first and second orders at a plurality of order prices (e.g., two first orders being the first orders $8120_3$, $8121_3$ shown in FIG. 9 and two second orders being the second orders $8141_3$, $8142_3$ shown in FIG. 9) may be deleted in shift procedure 2. Further, the shift function may be used together with the configuration of the settlement trail of a second embodiment of the present invention described later.

As described above, the first embodiment has the configuration in which the profit amount to be obtained through the transaction of one first order and one second order is calculated by calculation based on profit margin information for setting a profit margin as a size of profit to be obtained through the transaction of the one first order and the one second order and order amount setting information for setting an order amount of the one first order and/or the order amount of the one second order. Accordingly, when the information for setting the profit margin is obtained, the profit amount can be calculated and set based on the information. Therefore, it is possible to set the order amounts and the order prices of the first order and the second order based on the information of the profit margin. Then, the user of the financial product transaction management apparatus 1 can easily set the first order and the second order to order prices and order amounts which can easily obtain profit by inputting information of a desired profit margin. Accordingly, it is possible to easily realize setting of an order price desired by a user and setting of an order price having a high possibility of obtaining profit through a transaction in a case of setting order prices for conducting the transaction of the first order and the second order corresponding thereto in the transaction of the financial product conducted using a computer system.

The first embodiment has the configuration in which the profit margin to be obtained through the transaction of one first order and one second order is calculated by calculation based on profit amount setting information for setting a profit amount to be obtained through the transaction of the one first order and the one second order and order amount setting information for setting an order amount of the one first order and/or the order amount of the one second order. Accordingly, when the information for setting the profit amount is obtained, the profit margin can be calculated and set based on the information. Therefore, it is possible to set the order amounts and the order prices of the first order and the second order based on the information of the profit amount. Then, the user of the financial product transaction management apparatus 1 can easily set the first order and the second order to order prices and order amounts which can easily obtain profit by inputting information of a desired profit margin. Accordingly, it is possible to easily realize setting of an order price desired by a user and setting of an order price having a high possibility of obtaining profit through a transaction in a case of setting order prices for conducting the transaction of the first order and the second order corresponding thereto in the transaction of the financial product conducted using a computer system.

In the first embodiment, the order information is generated by changing the profit margin from a profit margin to another profit amount with the profit amount fixed to a specific amount based on the profit margin changing information for changing the previously-set profit margin to the other profit margin. Accordingly, the user can easily set the order prices and the order amounts of the first order and the second order to the order price and the order amount desired by the user while changing the previously-set profit margin with operation or the like of the user in a state in which the change parameter is only the profit margin as being easy for the user to understand the content of change.

In the first embodiment, the order information is generated by changing the profit amount from a profit amount to another profit amount with the profit margin fixed to a specific margin based on the profit amount changing information for changing the previously-set profit amount to the other profit amount. Accordingly, the user can easily set the order prices and the order amounts of the first order and the second order to the order price and the order amount desired by the user while changing the previously-set profit amount with operation or the like of the user in a state in which the change parameter is only the profit amount as being easy for the user to understand the content of change.

In the first embodiment, it is possible to perform any of processing to change the profit margin in a state in which the profit amount is fixed to a specific amount and processing to change the profit amount in a state in which the profit margin is fixed to a specific margin. Accordingly, it is possible to enable a user to select either setting of an order price of the setting of the order price based on a profit margin and the setting of the order price based on a profit amount, with the content of change of which being easy for the user to understand. Accordingly, it is possible to provide a financial product transaction management apparatus 1 which is highly convenient for a user while increasing variations of methods in order price setting.

In the first embodiment, by setting the order price range and the profit margin to be the same, it is possible to provide a state in which the content of setting or changing the order price range and the profit margin can be easily understood by the user. Accordingly, it is possible to provide a financial product transaction management apparatus which is highly convenient for a user.

In the first embodiment, it is possible to realize a state in which the order prices of a plurality of first orders set to different order prices and/or a plurality of second orders set to different order prices can be easily set as the order prices desired by the user or the order prices having a high possibility of obtaining profit from the transaction. Accordingly, it is possible to provide a financial product transaction management apparatus which is highly convenient for a user.

In the first embodiment, it is possible to realize a state in which the order price of the first order or the second order when the transaction of the first order and the second order corresponding to the first order is automatically repeated a plurality of times can be easily set as the order price desired by the user or the order price having a high possibility of obtaining the profit through the transaction.

In the first embodiment, in the case in which stop limit order information (not shown) exists in the order information group 18100 and the stop loss order is to be placed and contracted based on the stop limit order information (not shown), when the stop loss order (not shown) is contracted, the corresponding first order (e.g., the first order $8111_1$) and second order (e.g., the second order $8122_1$) are canceled. However, in this case, only the first order (e.g., the first order $8111_1$) and the second order (e.g., the second order $8122_1$) corresponding to the placed stop loss order (not illustrated) may be canceled, or all the first orders and all the second orders in the order information group 18100 including the corresponding first order (e.g., the first order $8111_1$) and second order (e.g., the second order $8122_1$) may also be canceled. Further, the first order and the second order which are scheduled to be repeatedly ordered and contracted thereafter may be canceled. Further, the orders (such as the corresponding first order (e.g., the first order $8111_1$) and the corresponding second order (e.g., the second order $8122_1$) may not be canceled.

Second Embodiment

FIGS. 11 to 15 show a second embodiment of the present invention. In the second embodiment, the present invention is applied to a configuration for conducting a transaction of "settlement trail".

[Basic Configuration]

The system configuration diagram (FIG. 1), the basic data structure (FIG. 2), and the order information generation procedure (the basic processing procedure from step S1 to step S10 in FIG. 3) of the second embodiment are the same as those of the first embodiment.

On the other hand, in the second embodiment, the trail width information is provided only for the second order which is the settlement order of the if-done order among the first order and the second order.

FIG. 12 is a diagram schematically showing a transaction display screen 50 after order information is generated, which is displayed on the display unit 22 of the client terminal 2 in the second embodiment. In this transaction display screen 50, the fields of the order date and time information 181E and the order time limit information 181H are displayed in the same manner as the display of the transaction display screen 24 shown in FIG. 8. For simplicity of explanation, fields of the order date and time information 181E and the order time limit information 181H are omitted in FIG. 12.

The basic configuration of the transaction display screen 50 shown in FIG. 12 is the same as that of the transaction display screen 24 shown in FIG. 8. However, it is different from the first embodiment in that the first order information 18111, 18112, . . . , 18120, 18121 and the second order information 18122, 18123, . . . , 18141, 18142 include, as attribute information, trail width information 181S for setting a trail width which is a price range in which a trail occurs, and through price range information 181T for setting a through price range being information indicating how much the market price falls or rises from the scheduled contact price to place an unplaced order.

Further, FIG. 12 is different from the transaction display screen 24 shown in FIG. 8 in that the "settlement trail" is set in the order type information 181J, the "stop limit order" is set in the execution condition information 181N, "Yes" indicating that the "settlement trail" is selected is set in the settlement trail information 181Q, and "Yes" indicating that the "stop loss order" is selected is set in the stop loss information 181R.

Further, the order input screen 100 shown in FIG. 12 is different from that of the first embodiment in that stop loss order information 18143 for conducting a stop loss order transaction is generated.

In the "settlement trail" of the second embodiment, a trail is set only for the second order (a settlement order for a new order) among the first order and the second order. Therefore, in FIG. 12, "0.500" indicating 0.500 yen/dollar is set in the trail width information 181S of only the second order information 18122, 18123, . . . , 18141, 18142 among the first order information 18111, 18112, . . . , 18120, 18121, the second order information 18122, 18123, . . . , 18141, 18142, and the stop loss order information 18143 constituting the order information group 18110, and "0.000" is set in the trail width information 181S of the first order information 18111, 18112, . . . , 18120, 18121 and the trail width information 181S of the stop loss order information 18143, indicating that no trail is set.

A transaction display screen 50 shown in FIG. 12 shows a state in which a transaction is conducted up to the state shown in FIG. 13 based on order information generated in a state in which numerical value input and selection are performed on the order input screen 100 shown in FIG. 11, which will be described later.

[Configuration and Input of Order Input Screen]

Figure 11:
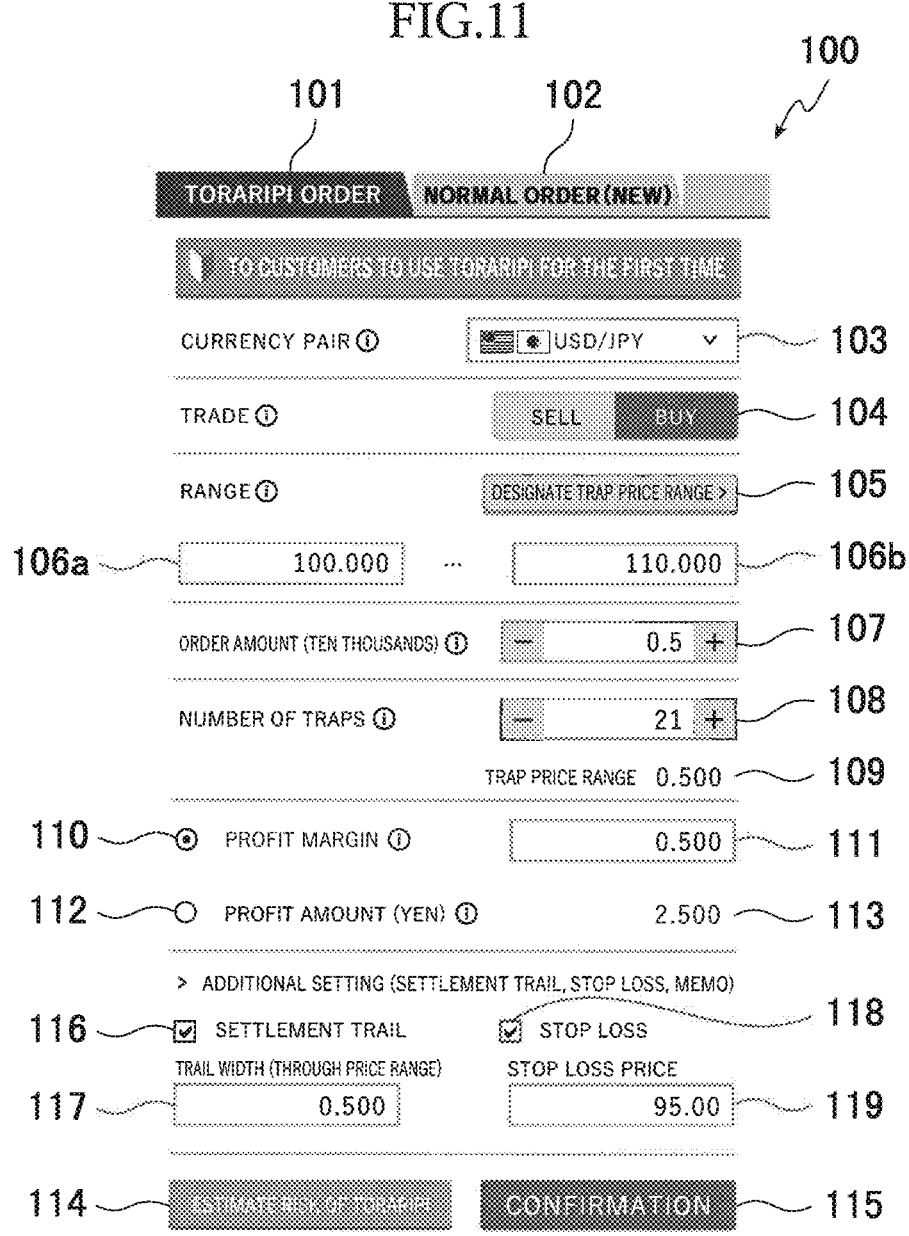
FIG. 11 is a diagram schematically showing an order input screen displayed at a client terminal in the financial product management system and the financial product management apparatus with selection and numerical input are performed for a "settlement trail" and a "stop loss order".

FIG. 11 is a conceptual diagram schematically showing the order input screen 100 according to the second embodiment.

The order input screen 100 is basically the same as the order input screen 100 shown in FIGS. 4 and 5. As a result of selecting "additional setting" (not shown in FIGS. 4 and 5), a settlement trail selection button 116 for selecting a transaction by "settlement trail", a trail width input field 117 for inputting a numerical value of a trail width of "settlement trail", a stop loss selection button 118 for selecting setting of a stop loss order, and a stop loss price input field 119 for inputting a numerical value of a stop loss order amount are displayed.

FIG. 11 shows a state in which a check for selecting "settlement trail" is input in the settlement trail selection button 116, "0.500" for setting a trail width of 0.500 yen/dollar is input in the trail width input field 117, a check for selecting setting of a stop loss order is input in the stop loss selection button 118, and "95.00" for setting 95.00 yen/dollar as an order price of a stop loss order is input in the stop loss price input field 119.

In the second embodiment, the trail width and the through price range are set to the same price, and the numerical value input in the trail width input field 117 of the order input screen 100 is used in common for setting the trail width and the through price range. However, in the order input screen 100, a field for inputting the through price range may be provided separately from the trail width input field 117, and the trail width and the through price range may be set separately.

[Processing Procedure After Order Information Generation]

Figure 13:
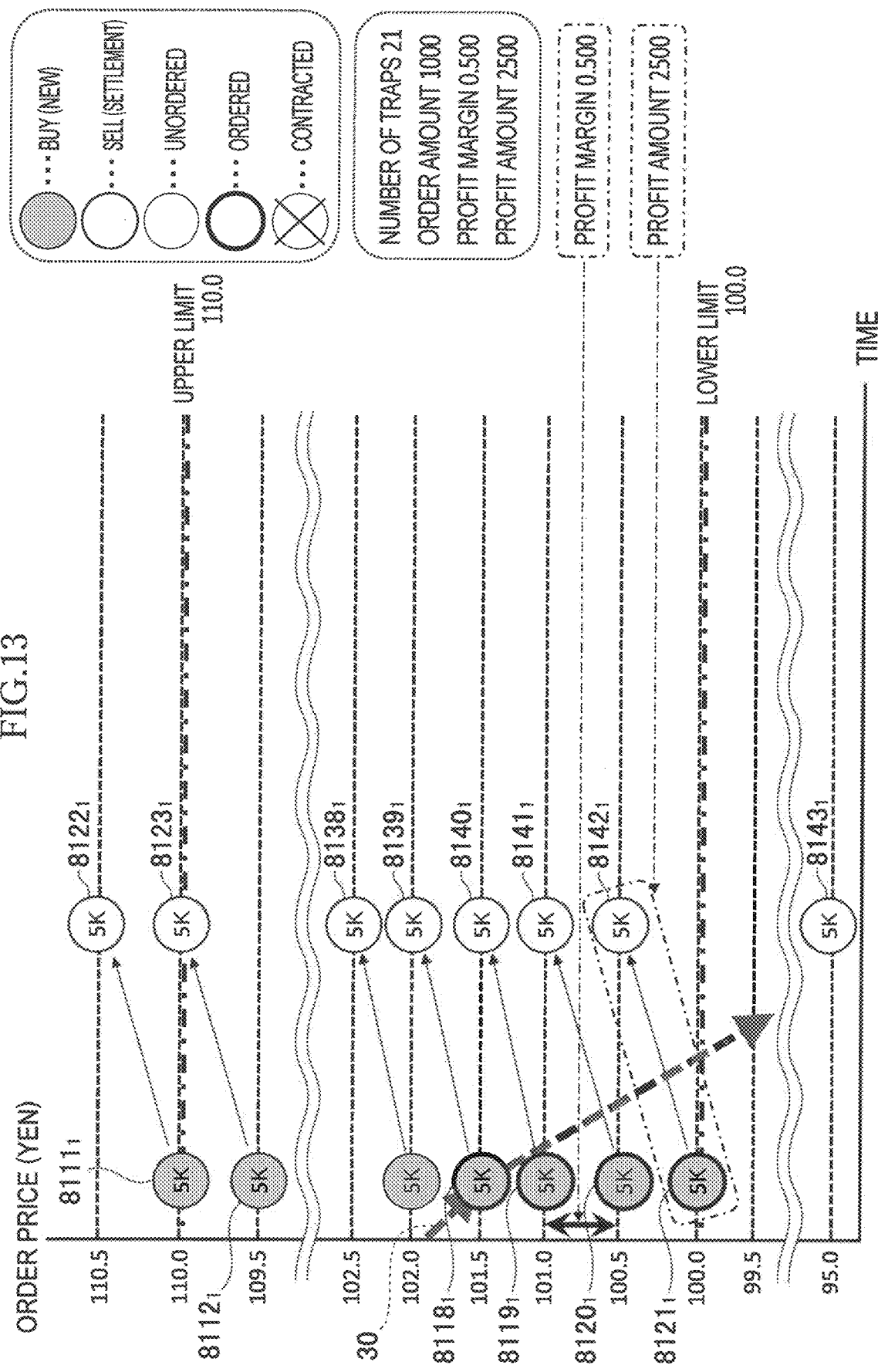
FIG. 13 is a chart schematically showing a transaction figure of the "settlement trail" performed according to order information generated based on processing in the financial product management system and the financial product management apparatus.
Figure 14:
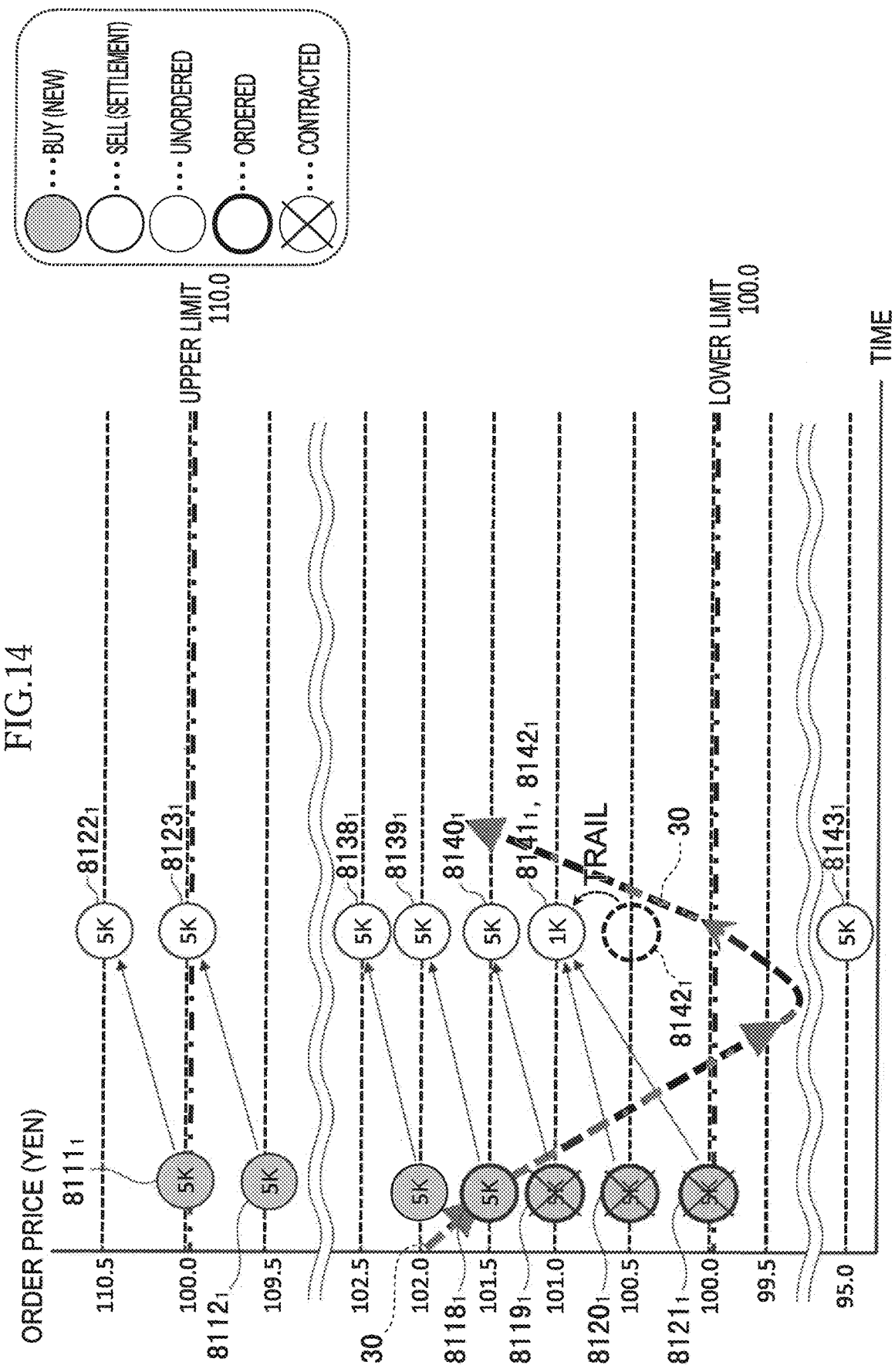
FIG. 14 is a chart schematically showing a transaction figure of the "settlement trail" performed according to order information generated based on processing in the financial product management system and the financial product management apparatus.

FIGS. 13 to 15 are charts each schematically showing order information generated based on the processing in the financial product transaction management system 1A (see FIG. 1) of the second embodiment and the transaction mode associated with market price fluctuation. Description of portions common to the processing procedure of the first embodiment will be omitted.

When one order information group 18110 shown in FIG. 12 is generated, the order status information 181P of the first order information 18111, 18112, . . . , 18120, 18121, the second order information 18122, 18123, . . . , 18141, 18142, and the stop loss order information 18143 are "unordered" indicating a status of "unordered and uncontracted".

Then, based on the first order information 18111, 18112, . . . , 18120, 18121, the first orders $8111_1$, $8112_1$, . . . , $8141_1$, $8120_1$, $8121_1$ are turned into the state of ordered and uncontracted, and the transaction is started.

For example, as shown in FIG. 13, it is assumed that the market price 30 at the start of the transaction is 101.80 yen/dollar, and the market price 30 falls to 99.40 yen/dollar.

In this case, the price information reception management unit 19 sequentially obtains information that the market price 30 becomes from 101.80 yen/dollar to 99.40 yen/dollar. When the information of the market price 30 is sequentially obtained, the contract information generation unit 14 changes the order status information 181P of the first order information 18118, 18119, 18120, 18121, which is the first order information in which the market price 30 falls to the lower price side by the price range of the through price range information 181T beyond the order price information 181G (i.e., to the lower price side by 0.500 yen/dollar or more than the order price information 181G), from "unordered" to "ordered". At this time, the transaction display screen 50 is in the state shown in FIG. 12.

By changing the first order information 18118, 18119, 18120, 18121 as described above, as shown in FIG. 13, the first orders $8118_1$, $8119_1$, $8120_1$, $8121_1$ are in the "ordered" status.

Next, as shown in FIG. 14, it is assumed that the market price 30 changes from a falling direction to a rising direction and rises from 99.40 yen/dollar to 101.70 yen/dollar.

When the price information reception management unit 19 sequentially obtains information in which the market price 30 becomes from 99.40 yen/dollar to 101.70 yen/dollar, the contract information generation unit 14 determines that the market price 30 of the first order information 18118, 18119, 18120, 18121 in which the order status information 181P is changed from "unordered" to "ordered" matches the order price information 181G, that is, determines that the order status information 181P of the first order information 18118, 18119, 18120, 18121 is changed from "ordered" to "contracted" and the first orders $8118_1$, $8119_1$, $8120_1$, $8121_1$ are contracted and positions are held. As described above, since no trail is set in the first order information 18111, 18112, . . . , 18120, 18121 (trail width information 181S is "0.000"), the first order information 18118, 18119, 18120, 18121 is contracted at the order price originally set in the order price information 181G. As a result, as shown in FIG. 13, the first orders $8118_1$, $8119_1$, $8120_1$, $8121_1$ are contracted at the initial order prices of 101.00, 100.50, and 100.00 yen/dollar.

The order information generation unit 16 changes the order status information 181P of the second order information 18142, 18141 of which the market price 30 has risen to the higher price side by the price range of the through price range information 181T or more (that is, to the higher price side of the order price information 181G by the amount of 0.500 yen/dollar) in the second order information 18139, 18140, 18141, 18142 of which the transaction of the second orders $8139_1$, $8140_1$, $8141_1$, $8142_1$ corresponding to the contracted first orders $8118_1$, $8119_1$, $8120_1$, $8121_1$ is conducted, from "unordered" to "ordered". Here, the order status information 181P of the second order information 11842, 11841 in FIG. 12 corresponding to the second orders $8142_1$, $8141_1$ in the state shown in FIG. 14 is changed from "unordered" to "ordered".

The order information generation unit 16 changes the order status information 181P of the stop loss order information 18143 shown in FIG. 12 from "unordered" to "ordered" to place the stop loss order $8143_1$ when the first order is initially contracted, that is, when the order status information 181P of the first order information 18121 shown in FIG. 13 becomes "contracted" and the first order $8121_1$ in FIG. 14 is contracted. Although not shown, when the market price 30 reaches 95.00 yen/dollar set in the order price information 181G of the stop loss order information 18143, the contract information generation unit 14 changes the order status information 181P of the stop loss order information 18143 from "ordered" to "contracted", and the stop loss order $8143_1$ is in a contracted state. As a result, transactions based on the order information group 18110 and transactions conducted based on the order information group 18110 scheduled to be generated thereafter are all processed as canceled.

On the other hand, in FIG. 14, when the market price 30 further rises from 100.00 yen/dollar, the order information generation unit 16 changes, toward the higher price side by the price set in the trail width information 181S, the order price information 181G of the second order information 18142, 18141, 18140 in which the market price 30 rises toward the higher price side beyond the order price information 181G by the sum of the price range of the through price range information 181T and the trail width information 181S (i.e., by 0.500 yen/dollar+0.500 yen/dollar=1.000 yen/dollar or more from the order price information 181G). Here, the order price information 181G of the second order information 18142 for conducting the transaction of the second order $8142_1$ in the state shown in FIG. 14 is changed to "101.00", which is higher by the trail width information 181S, and the order price of the second order $8142_1$ is changed from 100.50 yen/dollar to 101.00 yen/dollar.

Then, as shown in FIG. 15, it is assumed that the market price 30 rises from 101.70 yen/dollar to 102.30 yen/dollar, and then the market price 30 changes from the rising direction to the falling direction to reach 101.30 yen/dollar.

At this time, when the market price 30 reaches 102.00 yen/dollar, the order information generation unit 16 changes the order status information 181P of the second order information 18140 from "unordered" to "ordered" to make the second order $8140_1$ ordered.

Further, when the market price 30 reaches 102.00 yen/dollar, the order information generation unit 16 changes the order price information 181G of the second order information 18142, 18141 to "101.50" which is on the higher price side corresponding to the trail width information 181S, and changes the order price of the second orders $8141_1$, $8142_1$ from 101.00 to 101.50 yen/dollar. Thus, as shown in FIG. 15, the second orders $8140_1$, $8141_1$, $8142_1$ are set to 101.50 yen/dollar.

Then, when the market price 30 changes from rising to falling from 101.70 yen/dollar to 101.50 yen/dollar, the contract information generation unit 14 changes the order status information 181P of the second order information 18142, 18141, 18140 from "ordered" to "contracted" to make the second orders $8142_1$, $8141_1$, $8140_1$ contracted.

After the second orders $8142_1$, $8141_1$, $8140_1$ become into the contracted state, the order information generation unit 16 generates new first order information 18119, 18120, 18121 and new second order information 18140, 18141, 18142, and forms a state in which new first orders $8119_2$, $8120_2$, $8121_2$ and new second orders $8140_2$, $8141_2$, $8142_2$ corresponding to the contracted first orders $8119_1$, $8120_1$, $8121_1$ and the contracted second orders $8140_1$, $8141_1$, $8142_1$ can be ordered. In this procedure, the order information generation unit 16 may generate a new order information group 18110 including the new first order information 18119, 18120, 18121 and the new second order information 18140, 18141, 18142 for conducting transactions of the new first orders $8119_2$, $8120_2$, $8121_2$ and the new second orders $8140_2$, $8141_2$, $8142_2$.

By repeating the transaction described above for all the first order information 18111, 18112, . . . , 18120, 18121 and all the second order information 18122, 18123, . . . , 18141, 18142, the transaction based on the "settlement trail" is automatically repeated.

As described above, in the second embodiment, in the transaction of the "settlement trail", it is possible to set the order amounts and the order prices of the first order and the second order based on the information of the profit margin, or to set the orders amount and the order prices of the first order and the second order based on the information of the profit amount. Then, in the transaction of the "settlement trail", the first order and the second order can be easily set to the order price and the order amount that can easily obtain profit by inputting information of the profit margin desired by the user or the like of the financial product transaction management apparatus 1, inputting information of the profit amount desired by the user or the like, or the like. Therefore, in the second embodiment, the present invention can be applied to a transaction mode in which a large profit can be expected in one transaction.

In the second embodiment, trails are set only for the second orders $8122_1$, $8123_1$, . . . , $8141_1$, $8142_1$, but trails may also be set for the first orders $8111_1$, $8112_1$, . . . , $8120_1$, $8121_1$, or may be set only for the first orders $8111_1$, $8112_1$, . . . , $8120_1$, $8121_1$.

Application Example

In the financial product transaction management apparatus 1 shown in each of the above embodiments, the order information generation unit 16 may be configured to automatically set the profit margin or the profit amount. For example, the order information generation unit 16 may be configured to obtain information on the fluctuation range of the market price of the financial product during a period retroactive by a predetermined period with reference to a specific point in time, such as a point in time at which the order information is generated, and automatically set the profit margin and the profit amount of the first order and the second order for the respective order information based on the price range in which the market price fluctuates during the period. The configuration of the order information generation unit 16 or the like may include a machine learning function of artificial intelligence, learn information of fluctuation widths or fluctuation ranges of market prices of past financial products by machine learning or the like, automatically calculate a profit margin or a profit amount based on the learning result, and automatically set the profit margin or the profit amount of order information to be generated based on the calculation result.

[Others]

In each of the above embodiments, the case in which the first order is a buy order and the second order is a sell order has been described, but the present invention is not limited thereto, and the present invention is applicable to a case in which the first order is a sell order and the second order is a buy order.

In each of the above embodiments, the order may be a so-called OCO order. Further, the first orders $8111_1$, $8112_1$, . . . , $8120_1$, $8121_1$, the second orders $8122_1$, $8123_1$, . . . , $8141_1$, $8142_1$, and the like may be contracted by a so-called "Itayose method" when the market is resumed after once interrupted.

Furthermore, although each of the above embodiments is configured to generate order information in a price range between an upper limit price and a lower limit price by the "RAKUTRA" method, the present invention can be applied to a configuration for setting order information for conducting transactions such as "trap repeat if-done," "trap trade," or "repeat if-done" by setting order information on a higher price side than a reference lower limit price, setting order information on a lower price side than a reference upper limit price, or setting order information on a higher price side and a lower price side than a reference price.

In each of the above embodiments, the stock price index is handled as a financial product, but not limited thereto, the present invention may be applied to a financial product transaction management system that handles any financial products such as stocks, bonds, investment trusts, real estate investment trusts, commodities, foreign exchange, cryptographic assets, and the like.

In each of the above embodiments, the financial product transaction management system 1A has been described as including one financial product transaction management apparatus 1. However, it may be configured by a plurality of financial product transaction management apparatuses, and at least some of the financial product transaction management apparatuses may be provided in a so-called exchange.

In each of the above embodiments, all the functional units are provided in the financial product transaction management apparatus 1, but at least a part of the functional units may be provided in the client terminal 2.

Further, in each of the above embodiments, the financial product transaction management system 1A is realized in a client-server system of a network computer system. However, it is also possible to realize the same function as that of the financial product transaction management system 1A in various computers which do not constitute a client-server system such as personal computers and various communication terminals and portable information terminals such as portable terminals and tablets. In this case, at least a part of the system configuration of the financial product transaction management apparatus 1 and the financial product transaction management system 1A may be configured as a computer program, and the program may be implemented in various computers, various communication terminals, and portable information terminals.

It is natural that each of the above embodiments are examples of the present invention, and that the present invention is not limited only to the above embodiments.

What is claimed is:

1. A financial product transaction computer system to display information for conducting trading of a financial product, comprising:
    at least one computer processor configured to implement a client-server computer system including at least one client terminal and at least one server, the client-server computer system including at least one functional unit based on program and hardware resources to display information for conducting trading of the financial product, the at least one functional unit including:

an information display unit configured to cause a
terminal for a user who conducts trading of the
financial product to display an information input
field for allowing the user to input information
required for the trading of the financial product and
to display an information display field for displaying
a result of calculation based on the information in the
information input field;
a price information reception management unit configured to obtain information on a market price for the financial product;
an order information generation unit configured to generate order information as information for placing an order of the trading of the financial product; and
a contract information generation unit configured to cause the order to be contracted based on the order information generated by the order information generation unit,
the information display unit being configured to cause the terminal for the user to display:
  a profit margin input field, as the information input field, for allowing the user to input one profit margin as a size of profit to be obtained through a transaction of one first order and one second order of the financial product, among first orders each being an order to be traded antecedently and second orders each being an order to be traded subsequently to a corresponding first order and to input a new profit margin for changing a previously-input profit margin;
  a profit amount display field, as the information display field, for displaying a profit amount, calculated by using the one profit margin or the new profit margin, to be obtained through the transaction of the one first order and the one second order;
  an order amount input field, as the information input field, for allowing the user to input order amount setting information as information for setting an order amount of the one first order and the one second order; and
  a reference price input field, as the information input field, for allowing the user to input a reference price for setting a lower limit of an order price and/or a reference price for setting an upper limit of the order price among the first orders and/or the second orders,
the order information generation unit including:
  a profit amount setting unit configured to calculate the profit amount by multiplying the one profit margin of the profit margin input field by the order amount and cause a calculated profit amount to be displayed in the profit amount display field;
  a profit amount change unit configured to newly calculate a new profit amount by multiplying a new profit margin input in the profit margin input field by the order amount and cause the new profit amount to be displayed in the profit amount display field; and
  a price range setting unit configured to set a price range of the first orders or a price range of the second orders,
the order information generation unit configured to,
  generate plural pieces of first order information for conducting trading of each first order of the first orders with order prices of each first order set as being different from each other so that each order amount of each first order equals to each order amount set in the order amount input field and each order price, adjacent to each other, of the first orders define each price range set by the price range setting unit with reference to the reference price in the reference price input field, and
  generate plural pieces of second order information for conducting trading of each second order of second orders with order prices of each second order set as being different from each other so that each order amount of each second order equals to each order amount set in the order amount input field and each order price of the second orders is set as an order price which is set with reference to the reference price in the reference price input field and which provides the profit amount set by the profit amount setting unit or the profit amount changed by the profit amount change unit with respect to a corresponding order price of a corresponding first order of the first orders,
  generate each piece of the plural pieces of the first order information and each piece of the plural pieces of the second order information with execution condition information being set respectively therein to define an execution condition from among execution conditions of a market order, a limit order, and a stop order, is selected to make the order contracted; and
  perform an order-placement process of causing each first order and each second order to be placed based on each piece of the first order information and each piece of the second order information,
the contract information generation unit to perform:
  a contract process of causing each first order, with an order price which the market price obtained by the price information reception management unit has reached, to be contracted according to the execution condition, based on the execution condition information set for each piece of the first order information generated by the order information generation unit; and
  a contract process of causing each second order, with the order price which the market price obtained by the price information reception management unit has reached, to be contracted according to the execution condition, based on the execution condition information set for each piece of the second order information generated by the order information generation unit, and
the order information generation unit and the contract information generation unit being configured to repeatedly:
  generate each piece of the first order information by the order information generation unit:
  perform the order-placement process of causing each of the first orders to be placed by the order information generation unit based on the first order information:
  perform the contract process of causing each placed first order of the first orders to be contracted by the contract information generation unit when the market price obtained by the price information reception management unit reaches the order price of each placed first order;
  perform the order-placement process of causing each of the second orders corresponding to the first orders respectively to be placed by the order information generation unit based on a corresponding piece of the second order information when the contract information generation unit performs the contract process of causing each placed first order to be contracted; and perform the contract process of causing each placed second order of the second orders to be contracted by the contract information generation unit when the market price obtained by the price information reception management unit reaches the order price of each placed second order.

2. A financial product transaction computer system to display information for conducting trading of a financial product, comprising:

at least one computer processor configured to implement a client-server computer system including at least one client terminal and at least one server, the client-server computer system including at least one functional unit based on program and hardware resources display information for conducting trading of the financial product, the at least one functional unit including:

an information display unit configured to cause a terminal for a user who conducts trading of the financial product to display an information input field for allowing the user to input information required for the trading of the financial product and to display an information display field for displaying a result of calculation based on the information in the information input field;

a price information reception management unit configured to obtain information on a market price for the financial product;

an order information generation unit configured to generate order information as information for placing an order of the trading of the financial product; and a contract information generation unit configured to cause the order to be contracted based on the order information generated by the order information generation unit, the information display unit being configured to cause the terminal for the user to display:

a profit amount input field, as the information input field, for allowing the user to input one profit amount to be obtained through a transaction of one first order and one second order of the financial product, among first orders each being an order to be traded antecedently and second orders each being an order to be traded subsequently to a corresponding first order and to input a new profit amount for changing a previously-input profit amount information;

a profit margin display field, as the information display field, for displaying a profit margin, calculated by using the one profit amount or the new profit amount, to be obtained through the transaction of the one first order and the one second order;

an order amount input field, as the information input field, for allowing the user to input order amount setting information as information for setting an order amount of the one first order and the one second order; and a reference price input field, as the information input field, for allowing the user to input a reference price for setting a lower limit of an order price and/or a reference price for setting an upper limit of the order price among the first orders and/or the second orders, the order information generation unit including:

a profit margin setting unit configured to calculate the profit margin by dividing the one profit amount in the profit amount input field by the order amount and cause the profit margin to be displayed in the profit margin display field;

a profit margin change unit configured to newly calculate a new profit margin by dividing a new profit amount input in the profit amount input field by the order amount and cause a new profit margin to be displayed in the profit margin display field; and a price range setting unit configured to set a price range of the first orders or a price range of the second orders, the order information generation unit configured to, generate plural pieces of first order information for conducting trading of each first order of the first orders with order prices of each first order set as being different from each other so that each order amount of each first order equals to each order amount set in the order amount input field and each order price, adjacent to each other, of the first orders define each price range set by the price range setting unit with reference to the reference price in the reference price input field; and generate plural pieces of second order information for conducting trading of each second order of the second orders with order prices of each second order set as being different from each other so that each order amount of each second order equals to each order amount set in the order amount input field and each order price of the second orders is set as an order price which is set with reference to the reference price in the reference price input field and which provides the one profit amount set by the profit amount setting unit or the one profit amount changed by the profit amount change unit with respect to a corresponding order price of a corresponding first order of the first orders, generate each piece of the plural pieces of the first order information and each piece of the plural pieces of the second order information with execution condition information being set respectively therein to define an execution condition from among execution conditions of a market order, a limit order, and a stop order, is selected to make the order contracted; and perform an order-placement process of causing each first order and each second order to be placed based on each piece of the first order information and each piece of the second order information, the contract information generation unit performing:

a contract process of causing each first order, with the order price which the market price obtained by the price information reception management unit has reached, to be contracted according to the execution condition, based on the execution condition information set for each piece of the first order information generated by the order information generation unit; and a contract process of causing each second order, with the order price which the market price obtained by the price information reception management unit has reached, to be contracted according to the execution condition, based on the execution condition information set for each piece of the second order information generated by the order information generation unit, and the order information generation unit and the contract information generation unit being configured to repeatedly:
- generate each piece of the first order information by the order information generation unit;
- perform the order-placement process of causing each of the first orders to be placed by the order information generation unit based on the first order information;
- perform the contract process of causing each placed first order of the first orders to be contracted by the contract information generation unit when the market price obtained by the price information reception management unit reaches the order price of each first order;
- perform the order-placement process of causing each of the second orders corresponding to the first orders respectively to be placed by the order information generation unit based on a corresponding piece of the second order information when the contract information generation unit performs the contract process of causing each placed first order to be contracted; and
- perform the contract process of causing each placed second order of the second orders to be contracted by the contract information generation unit when the market price obtained by the price information reception management unit reaches the order price of each placed second order.

3. A non-transitory computer readable medium to store a program configured to cause a computer to function as the financial product transaction computer system according to claim 1.

4. A non-transitory computer readable medium to store a program configured to cause a computer to function as the financial product transaction computer system according to claim 2.

5. A financial product transaction management apparatus for conducting trading of a financial product, comprising:
- an information display unit configured to cause a terminal for a user who conducts trading of the financial product to display an information input field for allowing the user to input information required for the trading of the financial product and to display an information display field for displaying a result of calculation based on the information in the information input field;
- a price information reception management unit configured to obtain information on a market price for the financial product;
- an order information generation unit configured to generate order information as information for placing an order of the trading of the financial product; and
- a contract information generation unit configured to cause the order to be contracted based on the order information generated by the order information generation unit, the information display unit being configured to cause the terminal for the user to display:
- a profit margin input field, as the information input field, for allowing the user to input one profit margin as a size of profit to be obtained through a transaction of one first order and one second order of the financial product, among first orders each being an order to be traded antecedently and second orders each being an order to be traded subsequently to a corresponding first order and to input a new profit margin for changing a previously-input profit margin;
- a profit amount display field, as the information display field, for displaying a profit amount, calculated by using the one profit margin or the new profit margin, to be obtained through the transaction of the one first order and the one second order;
- an order amount input field, as the information input field, for allowing the user to input order amount setting information as information for setting an order amount of the one first order and the one second order;
- a profit amount input field, as the information input field, for allowing the user to input one profit amount to be obtained through a transaction of one first order and one second order among the first orders and the second orders and to input a new profit amount for changing a previously-input profit amount information;
- a profit margin display field, as the information display field, for displaying a profit margin;
- an order amount input field, as the information input field, for allowing the user to input order amount setting information as information for setting an order amount of the one first order and the one second order; and
- a reference price input field, as the information input field, for allowing the user to input a reference price for setting a lower limit of an order price and/or a reference price for setting an upper limit of the order price among the first orders and/or the second orders, the order information generation unit including:
- a profit amount setting unit configured to calculate the profit amount by multiplying the one profit margin in the profit margin input field by the order amount and cause the profit amount to be displayed in the profit amount display field;
- a profit amount change unit configured to newly calculate a new profit amount by multiplying a new profit margin input in the profit margin input field by the order amount and cause the new profit amount to be displayed in the profit amount display field;
- a profit margin setting unit configured to calculate the profit margin by dividing the one profit amount in the profit amount input field by the order amount and cause the profit margin to be displayed in the profit margin display field;
- a profit margin change unit configured to newly calculate a new profit margin by dividing a new profit amount input in the profit amount input field by the order amount and cause the new profit margin to be displayed in the profit margin display field; and
- a price range setting unit configured to set a price range of the first orders or a price range of the second orders, the order information generation unit being configured to:
- generate plural pieces of first order information for conducting trading of the first orders with order prices set as being different from each other so that each order amount equals to the order amount set in the order amount input field and the order prices, adjacent to each other, of the first orders define the price range set by the price range setting unit with reference to the reference price in the reference price input field;
- generate plural pieces of second order information for conducting trading of the second orders with order prices set as being different from each other so that each of the order amounts equals to the order amount set in the order amount input field and each order price of the second orders is set as the order price which is set with reference to the reference price in the reference price input field and which provides the profit amount set by the profit amount setting unit or the profit amount changed by the profit amount change unit with respect to a corresponding order price of the corresponding first order, or each of the order amounts equals to the order amount set in the order amount input field and each order price of the second orders is set as the order price which is set with reference to the reference price in the reference price input field and which provides the profit margin set by the profit margin setting unit or the profit margin changed by the profit margin change unit with respect to the corresponding order price of a corresponding first order;

generate each piece of the first order information and each piece of the second order information with execution condition information being set respectively therein to define which execution condition, of a market order, a limit order, and a stop order, is selected to make the order contracted; and perform an order-placement process of causing each of the first orders and each of the second orders to be placed based on each piece of the first order information and each piece of the second order information, the contract information generation unit performing:

a contract process of causing each of the placed first orders, with the order price which the market price obtained by the price information reception management unit has reached, to be contracted according to an execution condition among execution conditions of any of the market order, the limit order, and the stop order, based on the execution condition information set for each piece of the first order information generated by the order information generation unit; and a contract process of causing each of the placed second orders, with the order price which the market price obtained by the price information reception management unit has reached, to be contracted according to the execution condition, based on the execution condition information set for each piece of the second order information generated by the order information generation unit, and the order information generation unit and the contract information generation unit being configured to repeatedly:

generate each piece of the first order information by the order information generation unit;

perform the order-placement process of causing each first order of the first orders to be placed by the order information generation unit based on the first order information;

perform the contract process of causing each placed first order to be contracted by the contract information generation unit when the market price obtained by the price information reception management unit reaches the order price of each placed first order;

perform the order-placement process of causing each placed second order of the second orders corresponding to the first orders respectively to be placed by the order information generation unit based on a corresponding piece of the second order information when the contract information generation unit performs the contract process of causing each placed first order to be contracted; and perform the contract process of causing each placed second order of the second orders to be contracted by the contract information generation unit when the market price obtained by the price information reception management unit reaches the order price of each placed second order.

6. A non-transitory computer readable medium to store a program configured to cause a computer to function as the financial product transaction management apparatus according to claim 5.

* * * * *

UNITED STATES PATENT AND TRADEMARK OFFICE
CERTIFICATE OF CORRECTION

| | | |
|---|---|---|
| PATENT NO. | : 12,154,168 B2 | Page 1 of 1 |
| APPLICATION NO. | : 17/703606 | |
| DATED | : November 26, 2024 | |
| INVENTOR(S) | : Hitoshi Aiba | |

It is certified that error appears in the above-identified patent and that said Letters Patent is hereby corrected as shown below:

In the Claims

Column 40, Line 54:
In Claim 1, delete "unit:" and insert --unit;--.

Column 40, Line 58:
In Claim 1, delete "information:" and insert --information;--.

Signed and Sealed this
Fourth Day of February, 2025

Coke Morgan Stewart
*Acting Director of the United States Patent and Trademark Office*